(12) United States Patent
Wei et al.

(10) Patent No.: US 11,251,960 B1
(45) Date of Patent: Feb. 15, 2022

(54) SERVER-BASED WI-FI PROTECTED SETUP (WPS) PIN PROCEDURE

(71) Applicant: Amazon Technologies, Inc., Seattle, WA (US)

(72) Inventors: QingYun Wei, San Jose, CA (US); Andrew Roths, Kenmore, WA (US); James Edwin Christy, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 16/165,835

(22) Filed: Oct. 19, 2018

(51) Int. Cl.
| *H04L 9/32* | (2006.01) |
| *H04L 9/08* | (2006.01) |
| *H04W 12/06* | (2021.01) |
| *H04L 29/06* | (2006.01) |
| *H04W 76/10* | (2018.01) |
| *H04W 12/04* | (2021.01) |

(Continued)

(52) U.S. Cl.
CPC .......... *H04L 9/3228* (2013.01); *H04L 9/0863* (2013.01); *H04L 9/321* (2013.01); *H04L 63/0435* (2013.01); *H04L 63/0876* (2013.01); *H04W 12/04* (2013.01); *H04W 12/06* (2013.01); *H04W 76/10* (2018.02); *H04L 61/6022* (2013.01); *H04L 2209/80* (2013.01); *H04W 84/12* (2013.01)

(58) Field of Classification Search
CPC ..... H04W 12/06; H04W 12/08; H04W 76/10; H04W 84/12; H04L 67/02; H04L 9/32; H04L 9/3228; H04L 9/3226; H04L 9/321; H04L 9/0863; H04L 63/083; H04L 63/08; H04L 63/101; H04L 63/1416; H04L 63/0876; H04L 63/145; H04L 63/0236; H04L 63/0435

See application file for complete search history.

(56) References Cited

U.S. PATENT DOCUMENTS

| 6,978,385 B1 * | 12/2005 | Cheston | ................ | H04L 63/083 726/18 |
| 10,673,630 B2 * | 6/2020 | Pakkan | ................ | H04W 12/04 |

(Continued)

OTHER PUBLICATIONS

Wi-Fi Alliance, "Wi-Fi Protected Setup Specification," Version 1.0h., Dec. 2016, 110 pages.

(Continued)

*Primary Examiner* — Kristine L Kincaid
*Assistant Examiner* — Shaqueal D Wade-Wright
(74) *Attorney, Agent, or Firm* — Kilpatrick Townsend & Stockton LLP

(57) ABSTRACT

Techniques for providing a server-based Wi-Fi Protected Setup (WPS) PIN procedure are described. In an example, a computing device generates a PIN associated with a WPS-PIN procedure. The computing device encrypts the PIN to generate an encrypted PIN based on a public key associated with a server. Further, the computing device sends, to another computing device that is communicatively coupled with the server via an access point, a WPS probe request that includes the encrypted PIN. Based on the WPS probe request, the computing device receives, from at least one of the other computing devices or the server, a credential associated with the access point. The computing devices connects to the access point based on the credential.

20 Claims, 11 Drawing Sheets

(51) Int. Cl.
*H04L 29/12* (2006.01)
*H04W 84/12* (2009.01)

(56) References Cited

U.S. PATENT DOCUMENTS

| | | | | |
|---|---|---|---|---|
| 2010/0217975 A1* | 8/2010 | Grajek | ............. | G06F 21/445 |
| | | | | 713/157 |
| 2011/0271334 A1* | 11/2011 | Yang | ............. | H04W 12/06 |
| | | | | 726/7 |
| 2012/0254622 A1* | 10/2012 | Kanungo | ............. | G06F 21/34 |
| | | | | 713/183 |
| 2013/0223279 A1* | 8/2013 | Tinnakornsrisuphap | ............. | |
| | | | | H04W 12/04 |
| | | | | 370/254 |
| 2014/0068036 A1* | 3/2014 | Patil | ............. | H04L 41/0886 |
| | | | | 709/222 |
| 2014/0376721 A1* | 12/2014 | Perez | ............. | H04W 12/06 |
| | | | | 380/270 |
| 2016/0065370 A1* | 3/2016 | Le Saint | ............. | H04L 9/14 |
| | | | | 713/155 |
| 2016/0087967 A1* | 3/2016 | Pang | ............. | H04L 63/065 |
| | | | | 726/6 |
| 2017/0163626 A1* | 6/2017 | Meng | ............. | H04L 63/083 |
| 2018/0007037 A1* | 1/2018 | Reese | ............. | H04L 9/3297 |

OTHER PUBLICATIONS

Linux, "wpa_supplicant and Wi-Fi Protected Setup (WPS)," https://w1.fi/cgit/hostap/plain/wpa_supplicant/README-WPS, Accessed Oct. 19, 2018, 4 pages.

Linux, "hostapd and Wi-Fi Protected Setup (WPS)," https://w1.fi/cgit/hostap/plain/hostapd/README-WPS, Accessed Oct. 19, 2018, 4 pages.

Android, "WifiManager—Public Class WifiManager," https://developer.android.com/reference/android/net/wifi/WifiManager, Accessed Oct. 19, 2018, 45 pages.

* cited by examiner

SERVER-BASED WI-FI PROTECTED SETUP (WPS) PIN PROCEDURE

BACKGROUND OF THE INVENTION

Most computing devices, such as consumer electronics, support wireless connectivity. Typically, a computing device connects to a wireless access point, such as a wireless network router, that provides access to a data network. Wi-Fi Protected Setup (WPS) is a network security standard that allows a user to create a secure wireless home network and connect the computing device to the wireless access point.

WPS supports multiple modes including a personal identification number (PIN) mode, referred to as a WPS-PIN mode. Under the WPS-PIN mode, the user can input a PIN at a user interface of the wireless access point. This PIN is typically available from a label attached to the computing device or is displayed by the computing device to the user. Thereafter, the computing device and the wireless access point authenticate and associate with each other to set-up a Wi-Fi connection.

BRIEF DESCRIPTION OF THE DRAWINGS

Various embodiments in accordance with the present disclosure will be described with reference to the drawings, in which.

DETAILED DESCRIPTION OF SPECIFIC EMBODIMENTS

Figure 1:
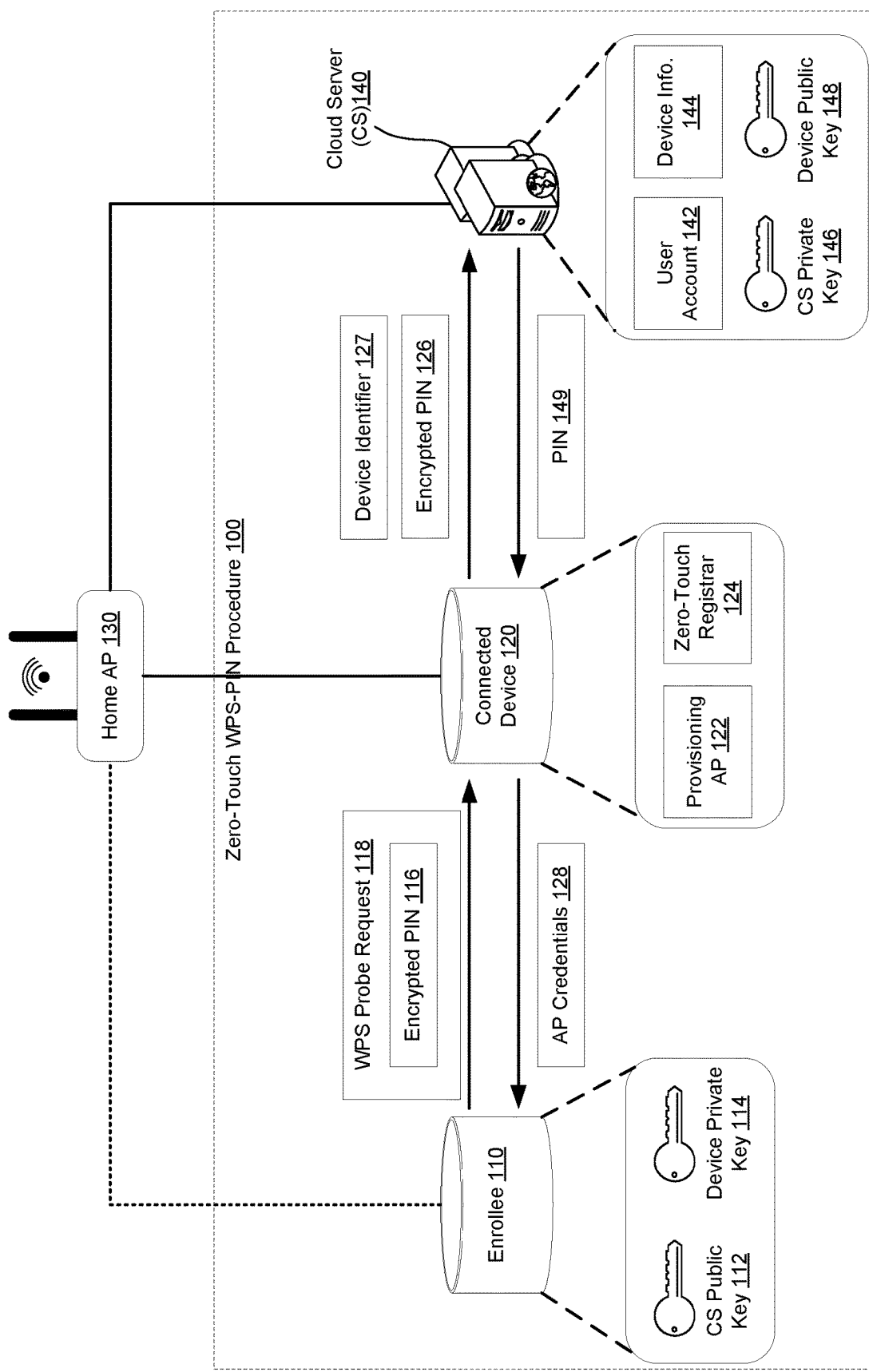
FIG. 1 illustrates an example network environment that supports a server-based WPS-PIN procedure, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a server-based WPS-PIN procedure to connect a computing device to a wireless access point. The server-based WPS-PIN procedure allows a user to establish a wireless connection without having to input a PIN, without a change to the WPS-PIN procedure, and with added security. In an example, the server-based WPS-PIN procedure may involve the computing device to be connected (referred to herein as "enrollee" in the interest of clarity), a server, and an already connected device that has access to the data network and is already registered with the server under a user account. This connected device can be the wireless access point or another computing device (which is referred to herein as a "provisioning access point"). The enrollee may generate a PIN and protect it based on a public key of the server. The PIN may be added to a WPS probe request and sent from the enrollee to the connected device over a Wi-Fi channel between the two devices. In turn, the connected device may send the encrypted PIN, among other device information, to the server over the data network. The server may authenticate and decrypt the encrypted PIN to retrieve the PIN. The PIN may be sent back to the connected device, and the connected device and enrollee may complete a WPS-PIN procedure of the WPS protocol based on the PIN. Upon completion of this procedure, credentials of the wireless access point (e.g., its service set identifier (SSID) and passphrase) may be provided to the enrollee. The enrollee may then use the credentials to connect to the wireless access point and obtain access to the data network.

To illustrate, consider an example of connecting multiple voice-controlled multimedia devices (VCMDs) to a router. A user may use the WPS-PIN procedure (e.g., by inputting the relevant PIN at a graphical user interface of the router) or any other connection procedure (e.g., a WPS-push procedure) to connect a first VCMD to the router, whereby the first VCMD may store the SSID and passphrase of the router in local memory. The user may also register the first VCMD with a cloud server under a user account. Subsequently, the server-based WPS-PIN procedure may become available to connect any or all of the remaining VCMDs, where the first VCMD may be used as a provisioning AP. In particular, upon power-up, a second VCMD may enter a discovery mode and connect to the first VCMD over a Wi-Fi channel. The second VCMD may generate and send an encrypted PIN to the first VCMD over that channel and the first VCMD may pass the encrypted PIN to the cloud server over the Internet via the router. The cloud server may decrypt and return the PIN to the first VCMD. The first VCMD and the second VCMD may then complete the WPS-PIN procedure and, upon completion, the first VCMD may send the router's SSID and passphrase from local memory to the second VCMD. The second VCMD may connect over Wi-Fi to the router by using the SSID and the passphrase, thereby gaining access to the Internet via the router. Hence, the user no longer needs to input a PIN to connect the second VCMD or any other remaining VCMDs. Instead, the connections may be automatically and securely established based on the server-based WPS-PIN procedure provided by embodiments of the present disclosure. In this illustrative example, a VCMD can represent a smart speaker providing an intelligent personal assistant service responsive to a wakeword and capable of different interactions including content playing, providing real-time information, and performing tasks and routines.

The server-based WPS-PIN procedure may provide many technical improvements over conventional techniques. For example, this procedure may be implemented without a change to the WPS protocol. More specifically, the server-based WPS-PIN procedure described herein leverages the WPS-PIN procedure of the WPS protocol to implement device discovery, pre-authorization, and Wi-Fi credential provisioning. The Wi-Fi stacks on the enrollee(s) and already connected device(s) do not need to be updated. The discovery, authentication, and provisioning procedures can be implemented using the Wi-Fi layer WPS-PIN APIs. In another example, the zero touch WPS-PIN procedure may provide added security. More specifically, the PIN generated by an enrollee may be a one-time PIN (e.g., PIN is valid for a fixed duration of time or for only a one time use to authenticate the enrollee device to connected device). Accordingly, the server-based WPS-PIN procedure may become more resilient to brute-force attacks. Typically, the WPS-PIN procedure of the WPS protocol uses an eight digit PIN as the device password for authentication. If the eight digit PIN is static and applied to multiple enrollees, the PIN may be vulnerable to a brute-force attack. In comparison, the server-based WPS-PIN procedure should not be prone to the brute-force attack because the PIN is randomly generated per enrollee and used only for one time.

FIG. 1 illustrates an example network environment that supports a server-based WPS-PIN procedure, according to an embodiment of the present disclosure. As illustrated, the network environment includes an enrollee 110, a connected device 120, a home access point (AP) 130, and a cloud server 140. The connected device 120 may already have access to a data network (e.g. the Internet) via the home AP 130 and may be registered at the cloud server 140 under a user account 142. The enrollee 110 may rely on a server-based WPS-PIN procedure 100 to communicate with the connected device 120 and obtain credentials 128 of the home AP 130. Once the credentials are obtained, the enrollee 110 may connect to the home AP 130 to gain access to the data network.

In an example, the server-based WPS-PIN procedure 100 may rely on a cloud-based public key infrastructure (PKI). The cloud-based PKI infrastructure and the WPS-PIN procedure of the WPS protocol seamlessly work together to enable the enrollee 110 to securely join the wireless local area network (WLAN) automatically without user interactions.

As illustrated, the enrollee 110 may be a computing device such as a VCMD, a multimedia streaming device, a mobile device, a tablet, a laptop, or any other consumer electronic device that supports at least the WPS-PIN procedure of the WPS protocol. The enrollee 110 may be referred to as an enrollee computing device or a to be connected computing device to indicate that the enrollee 110 may have not been connected yet to the home AP 130. The enrollee 110 may store in its local memory a public key of the cloud server 140 (illustrated as a cloud server (CS) public key 112) and a private key of the enrollee 110 (illustrated as a device private key 114). These keys 112 and 114 may be provided to the enrollee 110 in support of the PKI infrastructure. In particular, the CS public key 112 and the device private key 114 may be loaded in the local memory during the production of the enrollee or during a firmware update (provided over the air, once the enrollee 110 connects with the connected device 120 as further described herein below).

Generally, the enrollee 110 supports the WPS-PIN procedure of the WPS protocol. As part of this support, the enrollee 110 may connect with the connected device 120 over a Wi-Fi channel during a discovery phase. As part of the server-based WPS-PIN procedure 100, the enrollee may also generate a WPS-PIN (e.g., an eight digit PIN) and may encrypt this PIN based on the public key 112 and the private key 114, thereby generating an encrypted PIN 116. The encrypted PIN 116 may be sent to the connected device 120, in for example, a WPS probe request 118. As more fully described herein below, the WPS probe request 118 may contain device information as defined in the WPS-PIN procedure of the WPS protocol. In addition and according to the embodiments of the present disclosure, the WPS probe request 118 includes the encrypted PIN 116 in, for instance, the device information. The encrypted PIN 116 is highlighted herein because of the difference over the traditional WPS probe request of the WPS-PIN procedure. The enrollee 110 may complete the WPS-PIN procedure with the connected device 120 and may receive the credentials 128 of the home AP 130. Once received, the enrollee 110 may establish a wireless connection to the home AP 130 (shown with a dotted line in FIG. 1) by using the credentials 128.

The connected device 120 may also be a computing device such as a VCMD, a multimedia streaming device, a mobile device, a tablet, a laptop, or any other consumer electronic device that supports at least the WPS-PIN procedure of the WPS protocol. The connected device 120 may be referred to as a connected computing device or a provisioning computing device to indicate that the connected device 120 may have already been connected to the home AP 130 and may be used to connect the enrollee 110 to the home AP 130. The connected device 120 and the enrollee 110 need not be of the same type.

A wireless connection (shown with a solid line in FIG. 1) may already exist between the connected device 120 and the home access point 130. This connection may have been established previously by using the WPS-PIN procedure or any other connection procedure (e.g., a WPS-Push procedure, user input of the credentials 128 of the home AP 130 at the connected device, etc.). Further, the connected device 120 may have been registered with a service provider under the user account 142 stored at the cloud server 140. The registration may include providing information about the connected device 120 to the cloud server 140 over the wireless connection and via the home AP 130. This information may include an identifier of the connected device 120 (e.g., a media access control (MAC) address of the connected device 120), a certificate of the connected device 120, a location of the connected device 120, an identifier of the user account 142, the credentials 128 used by the connected device 120 to connect to the home AP 130, and/or other device-related information. The user account 142 may store some or all of this information.

Generally, the connected device 120 may support the server-based WPS-PIN procedure 100 by passing relevant device information received from the enrollee 110, such as the encrypted PIN 116 (shown as encrypted PIN 126 when sent from the connected device 120) to the cloud server 140 and by receiving a WPS-PIN 149 from the cloud server 140 over the data network. Upon receiving this PIN 149, the connected device 120 may complete the WPS-PIN procedure with the enrollee 110 and, as applicable, provide the credentials 128 of the home AP 140 to the enrollee 110.

To support the server-based WPS-PIN procedure 100, the connected device 120 may include a provisioning AP 122 and a zero-touch registrar 124. These components 122 and 124 may be implemented as hardware or as a software module executing on hardware. The provisioning AP 122 may be configured as an access point that receives and sends WPS probe request frames from the enrollee 110 to the zero-touch registrar 124 and, as applicable, send the credentials 128 to the enrollee 110. The zero-touch registrar 124 may be configured as a WPS registrar to receive and process the WPS probe request frames from the provisioning AP 122. The registration of the connected device 120 may include a registration of the registrar 124 under the user account 142 to enable a secure channel (e.g., a transport layer security (TLS) channel) between the zero-touch registrar 124 and the cloud server 140. Over the secure channel, the zero-touch registrar 124 may forward relevant WPS information, such as the encrypted PIN 116 and an identifier of the enrollee 120 (e.g., its MAC address (shown as encrypted PIN 126 and device identifier 127, respectively, in FIG. 1) to the cloud server 140. In addition, the zero-touch registrar 124 may return the WPS-PIN 149 to the provisioning AP 122.

The cloud server 140 may be administered by the service provider and may be implemented as a hardware server within a datacenter of the service provider or a cloud service implemented as a server within the datacenter. Generally, the cloud server 140 may receive WPS-relevant information, such as the encrypted PIN 126 and the identifier of the enrollee 110 (e.g., its MAC address), from the connected device 120 over the data network via the home AP 130 (e.g., over the secure channel with the zero-touch registrar 124). In response, the cloud server 140 may authenticate and decrypt the encrypted PIN 126 based on a private key of the cloud server 140 (shown as cloud server (CS) private key 146) and a public key of the enrollee 110 (shown as device public key 148). The decrypted PIN (shown as the PIN 149 in FIG. 1) may be a WPS-PIN and may be sent to the connected device 120 over the data network via the home AP 103 (e.g., over the secure channel with the zero-touch registrar 124).

To do so, the cloud server 140 may store or have access to the user account 142 and device information 144 in for, instance, a registration database. As described herein above, the user account 142 may store registration information of the connected device 120. The enrollee 110 may be associated with the same user account 142 and, upon connecting to the home AP 130, may be registered under this account 142. Alternatively, a different user account may be used for the enrollee 110. The device information 144 may store information about the enrollee such as the identifier (e.g., its MAC address) and the device public key 148 of the enrollee 110.

In an example, when the enrollee 110 is purchased by a user under a user account, the device public key 148 and the MAC address of the enrollee 110 are sent to the cloud server 140 in association with the user account. Accordingly, the cloud server 140 may store the device information 144 under this user account that is associated with the enrollee 110. In a particular example, the device public key 148 and the MAC address are encoded in a label attached to the enrollee 110. Upon the purchase, this label is scanned and the device public key 148 and the MAC address are read and sent to the cloud server 140.

The home AP 130 may be a wireless access point, such as a router, that provides WLAN capability to different computing devices, including the connected device 120 and the enrollee 110 (upon connection). These computing devices may use the WLAN as their home network. Access to the data network, such as the Internet, via the home AP 130 may necessitate the user of the credentials 128 of the home AP 130. These credentials may be stored by the connected device 120 (upon connecting to the home AP 130) and/or the cloud server 140 (e.g., under the user account 142) and may be sent to the enrollee 110 to establish a wireless connection to the WLAN.

In an illustrative example, the enrollee 110 and the connected device 120 are associated with the same user account 142. When the enrollee 110 first powers up, the enrollee 110 starts a WPS-PIN procedure to try to find the connected device 120. The enrollee 110 generates a one-time eight digit WPS-PIN. Using a cryptography system, such as an elliptic curve integrated encryption scheme (ECIES) cryptosystem, the enrollee 110 encrypts and signs the eight digit PIN with its own private key 114 and the cloud server's 140 public key 112. Other cryptography system may be used including, for instance, ElGamal, Diffie Hellman/Elliptic Curve Diffie Hellman, or other systems using an asymmetric or symmetric cryptography algorithm such as Rivest-Shamir-Adleman (RSA), Advanced Encryption Standard (AES), Simon, Speck, Sa1sa20, ChaCha20 variant, Data Encryption Standard (DES), Triple DES (3DES), and/or Rivest Cipher 4 (RC4). The enrollee 110 also encodes the encrypted and signed PIN information into a standard WPS device_info structure. This device_info is broadcast to the connected device 120 in a WPS probe request 118. The provisioning AP 122 forwards this request to the zero-touch registrar 124. The zero-touch registrar 124 extracts the enrollee's 110 device_info structure and MAC address from the probe request and forwards them to the cloud server 140. With the enrollee's 110 MAC address, the cloud server 140 looks up the registration database to retrieve the enrollee's public key 148 and the user account 142. With cloud server's 140 private key 146 and enrollee's 110 public key 148, the cloud server decrypts the eight digit PIN from the device_info structure. After verifying that the PIN and the digital signature are valid, the cloud server 140 returns the eight digit PIN to the zero-touch registrar 124. The zero-touch registrar 124 passes the enrollee 110's MAC address as "Authorized MAC" to the provisioning AP 122. In response, the provisioning AP 122 initiates the WPS-PIN procedure with the enrollee 110. After the WPS-PIN procedure succeeds, the enrollee 110 obtains the provisioning AP's 122 credentials and connects to this AP 122 over a transmission control protocol/internet protocol (TCP/IP) connection to enable the enrollee 110 to complete further authentication with the cloud server 140. Upon authentication, the cloud server 140 transfers the home AP's 130 credentials 128 from the user account 142 to the enrollee 110 over a secure connection. The enrollee 110 then connects to the home AP 130 based on the received credentials 128. Of course, this example is provided for illustrative purposes and other variations are possible as further described in connection with the next figures.

Figure 2:
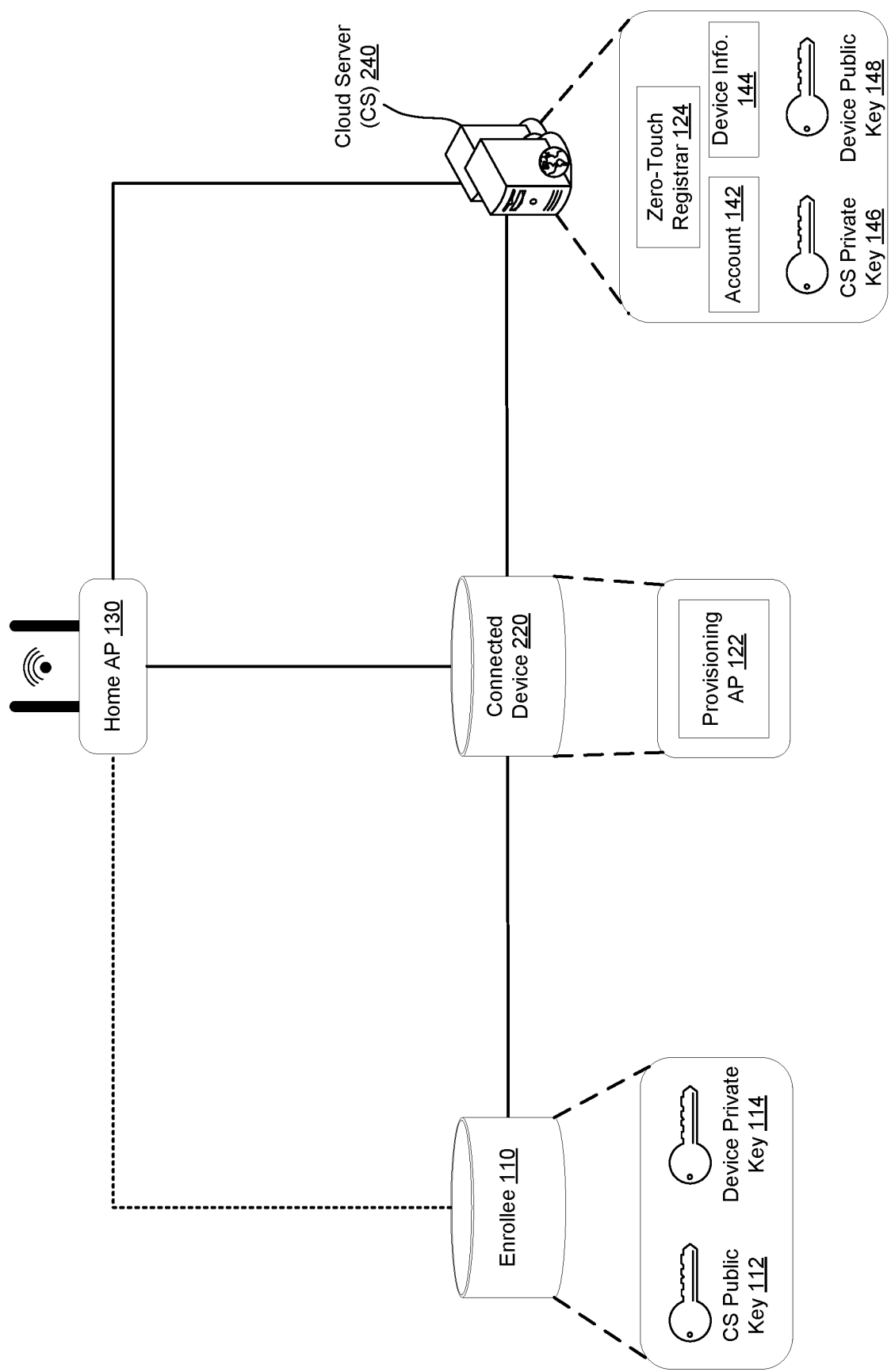
FIG. 2 illustrates another example network environment that supports a server-based WPS-PIN procedure, according to an embodiment of the present disclosure.

FIG. 2 illustrates another example network environment that supports a server-based WPS-PIN procedure, according to an embodiment of the present disclosure. The illustrated network environment represents a variation over the network environment of FIG. 1. In particular, the zero-touch registrar 124 may be remote from the provisioning AP 122, rather than being implemented within the same computing device. The network environment illustrated in FIG. 2 shares some similarities with the network environment in FIG. 1 and the description provided in relation to FIG. 1 is applicable to FIG. 2 as appropriate.

As illustrated, the network environment includes the enrollee 110 and the home AP 130, described herein above.

The network environment further includes a connected device 220 and a cloud server 240. The connected device 220 may already have access to a data network (e.g. the Internet) via the home AP 130 and may be registered at the cloud server 240 under a user account 142. The enrollee 110 may rely on a server-based WPS-PIN procedure to communicate with the connected device 220 and obtain credentials of the home AP 130. Once the credentials are obtained, the enrollee 110 may connect to the home AP 130 to gain access to the data network.

Here, the connected device 220 may be include similar components as the ones of the connected device 120 of FIG. 1, such as the provisioning AP 122. However, the connected device 220 does not include the zero-touch registrar 124. Instead, the zero-touch registrar 124 may be implemented by another device, remote from the connected device 220. In other words, the zero-touch registrar 124 is external to the connected device 122. In an example, the zero-touch registrar 124 and the connected device 120 are connected on the same WLAN. In this case, the zero-touch registrar 124 may communicate with the provisioning AP 122 by using the universal plug and play (UPnP) protocol. In another example, the zero-touch registrar 124 and the connected device 120 are not on the same WLAN. For instance, and as illustrated in FIG. 2, the cloud server 240 may host the zero-touch registrar 124.

Here also, the cloud server 240 may include similar components as the ones of the cloud server 140 of FIG. 1, such as the user account 142, the device information 144, the private key 146, and the public key 148. In an example, the cloud server 240 can also host the zero-touch registrar 124.

Figure 3:
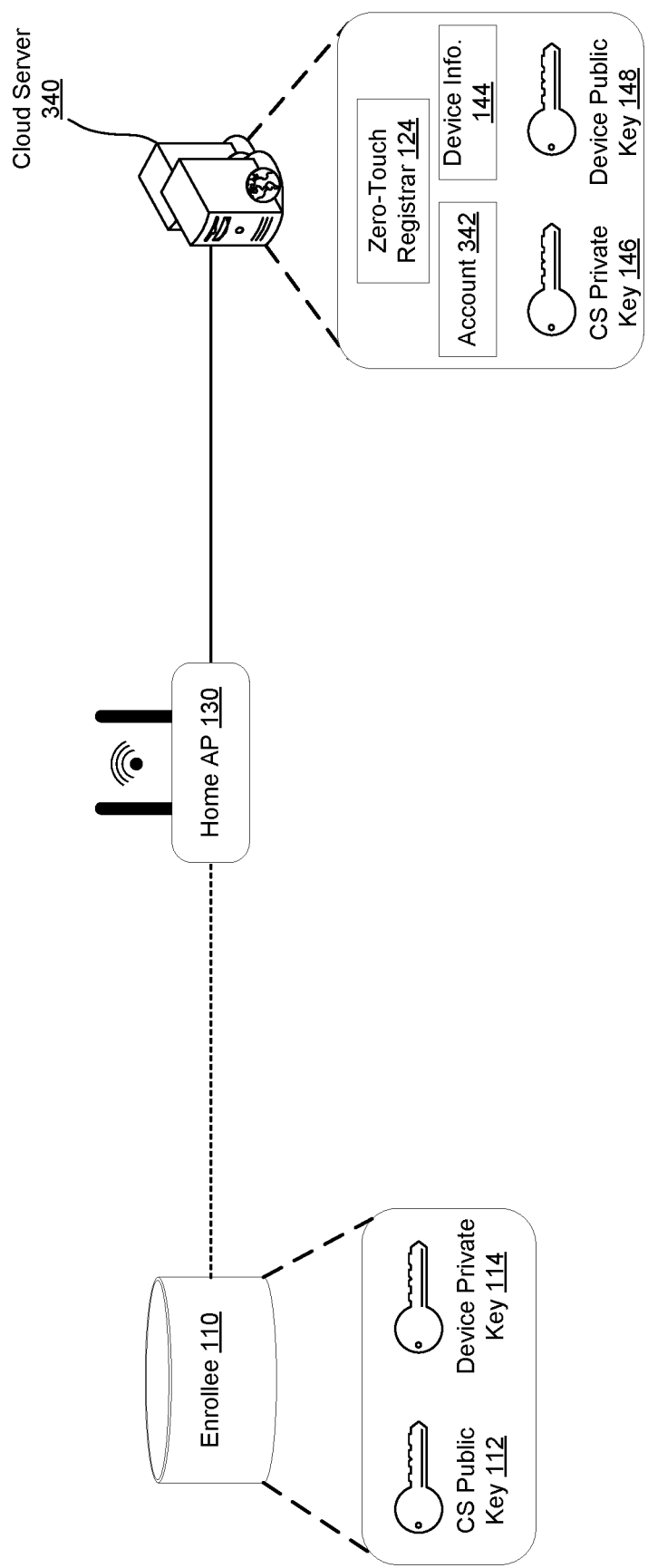
FIG. 3 illustrates yet another example network environment that supports a server-based WPS-PIN procedure, according to an embodiment of the present disclosure.

FIG. 3 illustrates yet another example network environment that supports a server-based WPS-PIN procedure, according to an embodiment of the present disclosure. The illustrated network environment represents a variation over the network environment of FIG. 1. In particular, the home AP 130 may be the connected device and may provide the functionalities of the provisioning AP. The network environment illustrated in FIG. 3 shares some similarities with the network environment in FIG. 1 and the description provided in relation to FIG. 1 is applicable to FIG. 3 as appropriate.

As illustrated, the network environment includes the enrollee 110 and the home AP 130, described herein above. The network environment further includes a cloud server 340. The home AP 130 may already be connected to the cloud server 340 over a data network (e.g. the Internet) and may be registered at the cloud server 340 under a user account 342. The user account 342 may store, among other things, an identifier of the home AP 130 (e.g., SSID, network address, etc.) and possibly other credentials (e.g., the passphrase). During a discovery phase, the enrollee 110 communicates with the home AP 130 over a Wi-Fi channel and sends a WPS probe request that includes an encrypted PIN. The home AP 130 passes the encrypted PIN and other WPS-related information (e.g., the enrollee's 110 MAC address) to the cloud server 340. In response, the cloud server 340 may return a PIN and the home AP 130 and the enrollee 110 may complete a WPS-PIN procedure. Upon completion, the home AP 130 may send its credentials to the enrollee 110 that then establishes a TCP/IP connection with the home AP 130 using these credentials to gain access to the data network.

Here, the cloud server 340 may include similar components as the ones of the cloud server 240 of FIG. 2, such the device information 144, the private key 146, the public key 148, and the zero-touch registrar 124. In addition, the cloud server stores the user account 342 that is used for the registration of the home AP 130. Upon receiving the WPS-related information from the home AP 130 (acting as a provisioning AP), the zero-touch registrar 124 accesses the encrypted PIN from this information, the cloud server 340 decrypts the encrypted PIN and returns the PIN to the zero-touch registrar 124, and the zero-touch registrar 124 sends the PIN to the home AP 130. The communication between the zero-touch registrar 124 and the home AP 130 can be carried over a secure channel of the data network.

Other variations of the network environment are also possible. For example and referring to a variation to the network environment of FIG. 3, the zero-touch registrar 124 may be hosted by the home AP 130 or by a remote device other than the cloud server 340.

Figure 4:
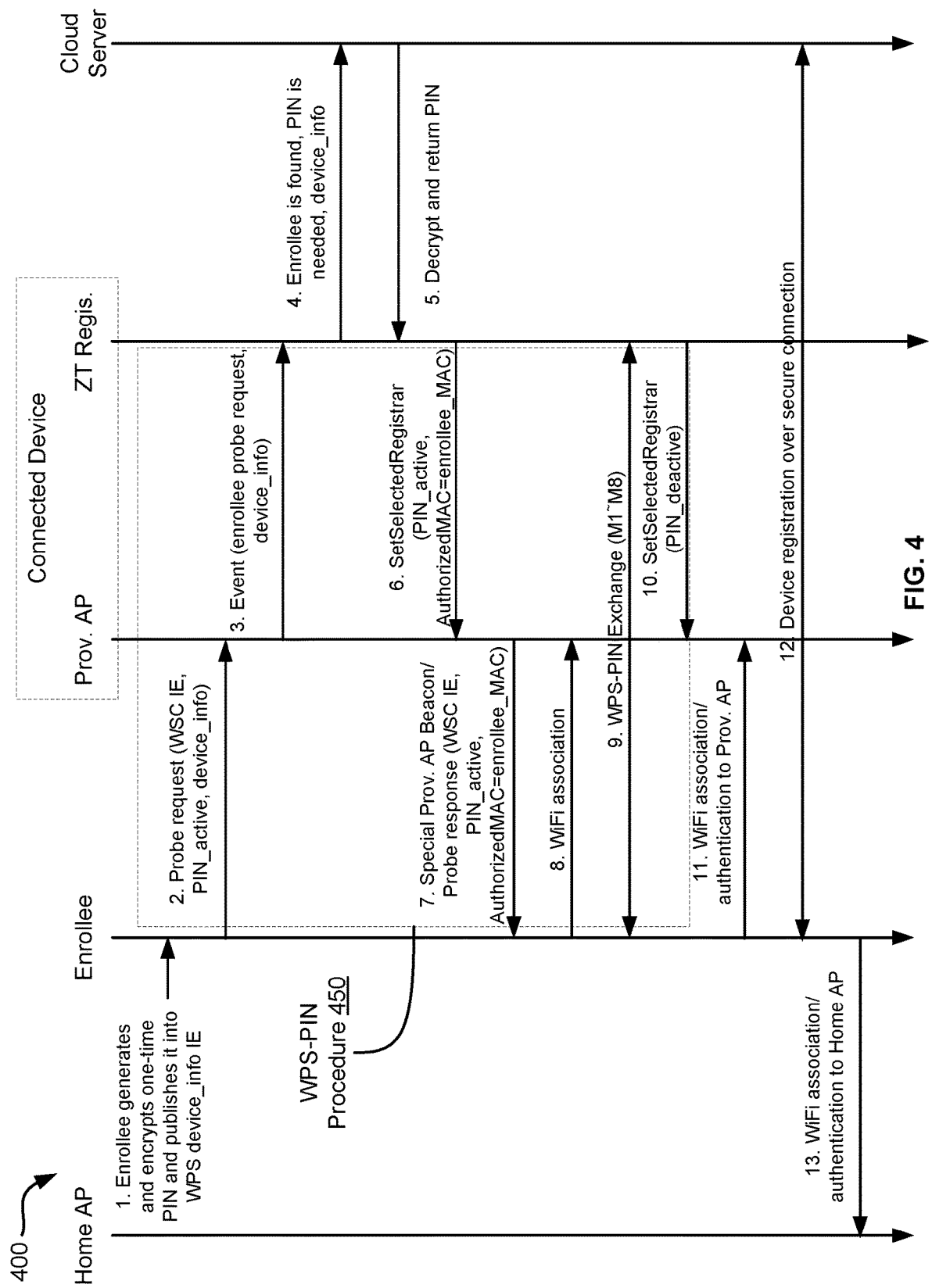
FIG. 4 illustrates an example block diagram for implementing a server-based WPS-PIN procedure, according to an embodiment of the present disclosure.

FIG. 4 illustrates an example block diagram for implementing a server-based WPS-PIN procedure 400, according to an embodiment of the present disclosure. The server-based WPS-PIN procedure 400 may be similar to the server-based WPS-PIN procedure 100 described herein above and may be implemented within a network environment similar to that of FIG. 1, including a home AP, an enrollee, a connected device, and a cloud server. The connected device may include a provisioning AP and a zero-touch registrar.

Generally, the server-based WPS-PIN procedure 400 defines a process that includes methods for steps to achieve automatic mutual discovery and secure Wi-Fi credential transfer. Some of the steps are common to the WPS-PIN procedure of the WPS protocol. FIG. 4 shows this commonality with a dashed box labeled as WPS-PIN procedure 450.

As illustrated, in a first step of the server-based WPS-PIN procedure 400, the enrollee generates a one-time PIN, encrypts it with the enrollee's private key and the cloud server's public key, and publishes the encrypted PIN into WPS device_info information elements (IEs). In this step, the enrollee can also generate authentication data, such as a digital signature, for verifying that the encrypted PIN is valid and has not been tampered. Although the encrypted PIN is illustrated as being added to the device_info IEs, the server-based WPS-PIN procedure 400 need not be limited as such. For instance, the encrypted PIN can be added to customized IEs in a probe request, instead of the WPS device_info IEs. In this case, the length of cypher text of the encrypted PIN need not be limited by the WPS device_info IE size, thereby allowing the use of different cryptography systems including, for instance, RSA based asymmetric cryptography system.

In a second step, the enrollee broadcasts WPS probe requests with WPS-PIN mode (e.g., set to PIN_active) and the coded device_info IEs to seek joining a WLAN supporting zero-touch over WPS-provisioning. This step may be similar to the WPS probe request broadcast of the typical WPS-PIN procedure 450, except that the device_info IEs include the encrypted PIN and authentication data.

In a third step, the provisioning AP receives and detects the enrollee's WPS-PIN probe requests and MAC address, and forwards the enrollee's MAC address and device_info to the zero-touch registrar. This step may be similarly defined under the typical WPS-PIN procedure 450, except that here the step is performed by the provisioning AP rather than the home AP.

In a fourth step, the zero-touch registrar sends the MAC address and device_info to the cloud server over a secure channel. This step may be similarly defined under the typical WPS-PIN procedure 450, except that at the end of the step a PIN request is sent to the cloud server rather than being presented on a display to a user.

In a fifth step, the cloud server determines whether the authentication data is valid and if so, decrypts the encrypted PIN based on the cloud server's private key and the enrollee's public key. The cloud server then returns the decrypted PIN to the zero-touch registrar.

In a sixth step, the zero-touch registrar requests the provisioning AP to enter a WPS-PIN active mode and provides an identifier of the enrollee (e.g., the enrollee's MAC address). This step may be similarly defined under the typical WPS-PIN procedure 450, except that the request is to the provisioning AP rather than the home AP. Optionally, the zero-touch registrar can pass the received PIN to the provisioning AP.

In a seventh step, the provisioning AP enters WPS-PIN active mode and responds to the enrollee WPS requests with beacon/probe responses. In the beacon/probe responses, the AuthorizedMAC IE specifies the allowed enrollee's MAC address and the "Selected Registrar" IE is set to TRUE. This step may be similarly defined under the typical WPS-PIN procedure 450, except that the response is from the provisioning AP rather than the home AP.

In an eighth step, the enrollee detects that its MAC address is in the AP's beacon and probe response AuthorizedMAC IE and, accordingly, determines that the provisioning AP is inviting the enrollee to start the WPS-PIN transaction. The enrollee associates to the provisioning AP such that the provisioning AP will relay the WPS registration protocol messages between the enrollee and the zero-touch registrar. This step may be similarly defined under the typical WPS-PIN procedure 450, except that the association is to the provisioning AP rather than the home AP.

In a ninth step, the zero-touch registrar and the enrollee complete the M1~M8 registration protocol transactions. During the exchange of messages M1~M8, the connected device and the enrollee authenticate each other using the decrypted PIN as the enrollee's password, and the registrar transfers the provisioning AP's credentials to the enrollee. This step may be similarly defined under the typical WPS-PIN procedure 450, except that the provisioning AP's credentials, rather than those of the home AP, are sent to the enrollee.

In a tenth step, the zero-touch registrar notifies the provisioning AP that the WPS-PIN transaction has completed. The provisioning AP exits the PIN-active mode. This step may be similarly defined under the typical WPS-PIN procedure 450, except that the notification is sent to provisioning AP rather than the home AP.

In an eleventh step, the enrollee uses the obtained WLAN credentials to connect to the provisioning AP interface to establish TCP/IP connectivity with the provisioning AP. This step may be similarly defined under the typical WPS-PIN procedure 450, except that the enrollee connects to provisioning AP rather than the home AP.

In a twelfth step, the provisioning AP acts as a proxy and lets the enrollee connect to the cloud server over a TSL/SSL tunneled channel. The cloud server further authenticates the enrollee over TLS/SSL, and then transfers the home AP's credentials to the enrollee. This step can be performed when the connected device (e.g., provisioning AP and/or the zero touch registrar) and the enrollee are associated with different user accounts. If the same user account is used, the provisioning AP can transfer the home AP's credentials to the enrollee from the connected device's local memory, as further described in connection with FIG. 5.

In a thirteenth step, the enrollee disconnects from the provisioning AP. The enrollee uses AP's credentials to then connect to the home AP to establish Internet and local network connectivity. Establishing this connection can include the enrollee associating and authenticating itself to the home AP (e.g., looking for an access point that has the home AP's SSID, requesting a connection thereto, and providing the passphrase).

As described herein above in connection with the first and fifth steps, the PIN is encrypted and included in the device_info IE along with authentication and then decrypted. This PIN protection (including the encryption, authentication, and decryption) can be achieved by using an encryption scheme that involves a shared key (e.g., a symmetric session key) derived from the asymmetric keys of the enrollee and server. In particular, the enrollee derives the shared key from the enrollee's private key and the cloud server's public key. The cloud server derives the same shared key from the cloud server's private key and the enrollee's public key. In an example, the elliptic curve integrated encryption scheme is used as further described herein next.

Typically, the WPS device_info IE follows the below structure. typedef struct {
  char device_name[32]; /**<Device name, up to 32 octets encoded in UTF-8.*/
  char manufacturer[64]; /**<Device manufacturer, up to 64 ASCII characters.*/
  char model_name[32]; /**<Model name, up to 32 ASCII characters.*/
  char model_number[32]; /**<Model number, up to 32 ASCII characters.*/
  char serial_number[32]; /**<Serial number of the device, up to 32 characters.*/ } wifi_wps_device_info_t;

The structure of the WPS device_info IE can be updated to encode the encrypted PIN and the authentication data. To do so, the elliptic curve integrated encryption scheme involves multiple crypto primitives such as:

(1) ECDH shared key generation:
  ECDH_compute_key(local_private_key, peer_public_key);
(2) Symmetric encryption/decryption and message authentication/verification:
  AES256_GCM_ENCRYPT(Key, IV, Plain_text, AAD),
  AES256_GCM_DECRYPT(Key, IV, Encrypted_text, AAD, Tag);
(3) Keyed-hash message authentication code, HMAC:
  HMAC_SHA256(Key, Text); and
(4) Binary-to-ASCII encoding and decoding:
  BASE64_ENCODE(Binary_string);
  BASE64_DECODE(ASCII_string).

ECDH (Elliptic Curve Diffie Hellman) key generation function ECDH_compute_key is used to compute the shared key based on the local elliptic curve private key and peer public key. AES GCM mode with 256-bit key length is used for the WPS PIN encryption/decryption and message authentication/verification. AES256_GCM_ENCRYPT( ) returns two values: the encrypted cipher text and the authentication tag. AES256_GCM_DECRYPT decrypts the cipher text and run the tag authentication code verification simultaneously. HMAC_SHA256 is used to derive the AES key and HMAC key from the ECDH shared key based on a nonce text. BASE64 is the binary-to-ASCII codec method.

To encode the WPS-PIN into the device_info IE, the enrollee follows the steps below:
(1) The enrollee generates a random 8-digit PIN. The 8-digit PIN is converted into a 4-byte binary string and appended with a 12-byte random padding to create an 8-byte PIN_payload;
(2) The enrollee uses its elliptic curve private key and cloud server's public key to create a 256-bit key ECDH_Key by calling ECDH (Elliptic Curve Diffie Hellman) key generation primitive ECDH_compute_key( ):
   ECDH_key=ECDH_compute_key(enrollee_private_key, cloud_server_public_key);
(3) The enrollee generates a 32-byte random number Nonce;
(4) Using ECDH_Key as the HMAC key, the enrollee calls HMAC_SHA256 to create the 256-bit hash code SK of the Nonce, SK becomes the shared key:
   SK=HMAC_SHA256(ECDH_Key, Nonce)
(5) The first 12 bytes of Nonce will be the IV for AES256_GCM encryption, and the last 20 bytes of SK will be the AAD (Additional Authenticated Data) for the AES256_GCM authentication:
   IV=Nonce[0 . . . 11]
   AAD=SK[12 . . . 31];
(6) Using SK as the encryption key and Nonce as the IV, the enrollee calls AES256_GCM_ENCRYPT to encrypt PIN_payload into the 8-byte PIN_cipher and 8-byte MAC:
   PIN_cipher, MAC=AES256_GCM_ENCRYPT(SK, Nonce, PIN_payload, AAD)
(7) The enrollee concatenates the PIN cipher, Nonce and MAC, a 48-byte CODED_PIN is created:
   CODED_PIN=(PIN_cipher||Nonce||MAC);
(8) Using BASE64, the 48-byte CODED_PIN is converted into a 64-byte ASCII string ASCII_CODED_PIN:
   ASCII_CODED_PIN=BASE64_ENCODE(CODED_PIN); and
(9) The first 32 bytes of ASCII_CODED_PIN becomes WPS device_info.device_name, and the last 32 bytes of ASCII_CODED_PIN becomes WPS device_info.model_number.
   WPS device_info.device_name=ASCII_CODED_PIN [0 . . . 31]
   WPS device_info.model_number=ASCII_CODED_PIN [32 . . . 63].

To decode the encrypted WPS-PIN from the WPS device_info IE, the cloud server follows the steps below:
(1) The cloud server combine the WPS device_info.device_name and WPS device_info.model_number to generate the 64-byte ASCII_CODED_PIN:
   ASCII_CODED_PIN=WPS device_info.device_name||WPS device_info. serial_number;
(2) The cloud server convert the ASCII_CODED_PIN into the 48-byte CODED_PIN by calling BASE64_DECODE:
   CODED_PIN=BASE64_DECODE(ASCII_CODED_PIN);
(3) The cloud_server retrieves the 8-byte PIN_cipher, 32-byte Nonce and 8-byte MAC from the CODED_PIN:
   PIN_cipher=CODED_PIN[0 . . . 7]
   Nonce=CODED_PIN[8 . . . 39]
   MAC=CODED_PIN[40 . . . 47];
(4) The cloud server computes the 256-bit ECDH_Key using cloud server's elliptic curve private key and enrollee's public key:
   ECDH_Key=ECDH_compute_key(cloud_server_private_key, enrollee_public_key);
(5) Using ECDH_Key as the HMAC key, the cloud server calls HMAC_SHA256 to create the 256-bit hash code SK of Nonce, SK becomes the shared key:
   SK=HMAC_SHA256(ECDH_Key, Nonce);
(6) The first 12 bytes of Nonce will be the IV for AES256_GCM decryption, and the last 20 bytes of Nonce will be the AAD for the AES GCM additional authentication data:
   IV=Nonce[0 . . . 11]
   AAD=SK[12 . . . 31];
(7) Using SK as the decryption key along with IV, AAD and MAC, the cloud server calls AES256_GCM_DECRYPT to decrypt PIN_cipher into the 8-byte PIN_payload:
   PIN_payload=AES256_GCM_DECRYPT(ENC_Key, IV, PIN_cipher, AAD, MAC) AES256_GCM_DECRYPT also verifies if the MAC mode is valid; and
(8) From the first 4 bytes of PIN_payload, the 8-digit PIN can be recovered.

Figure 5:
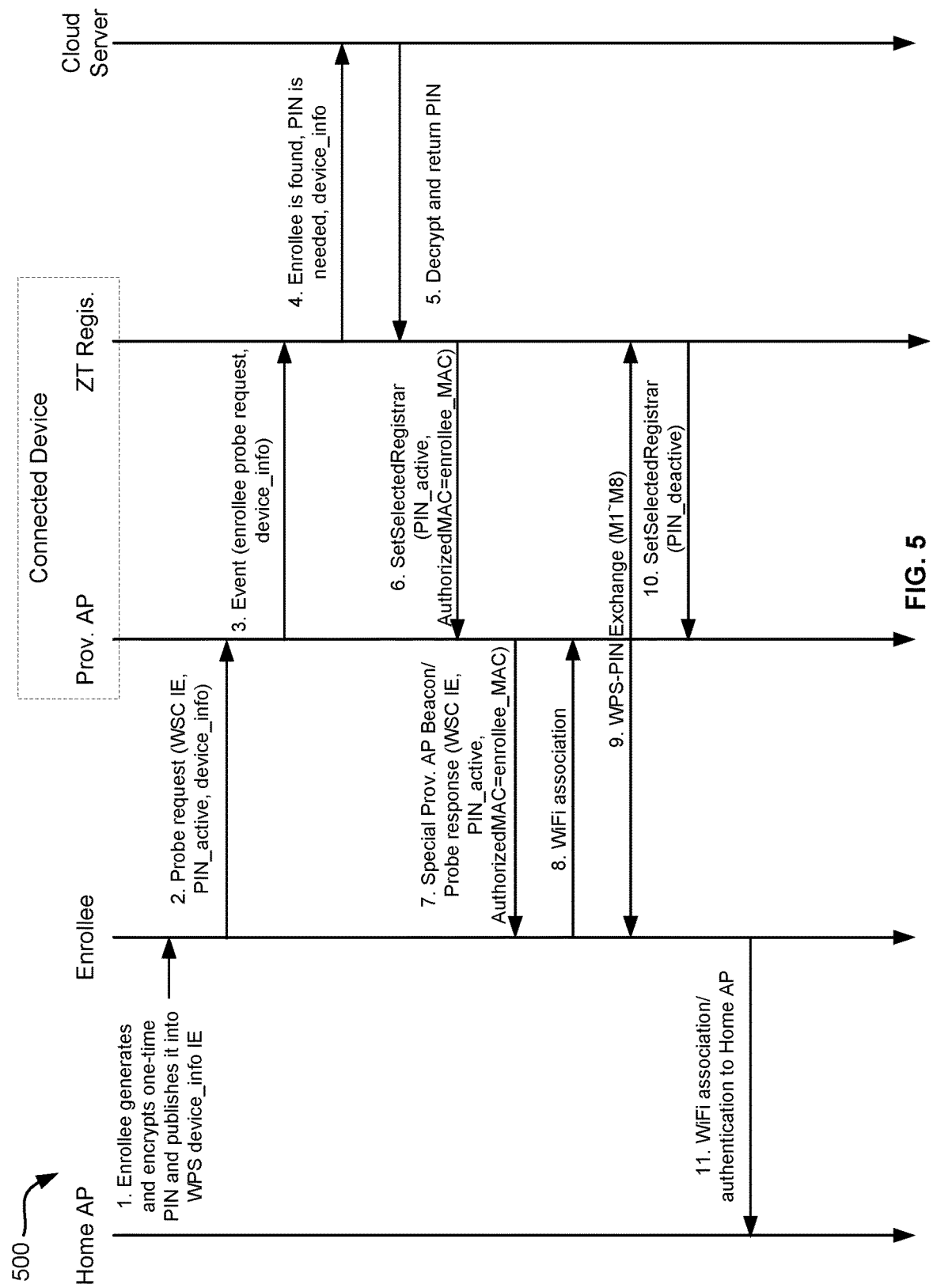
FIG. 5 illustrates another example block diagram for implementing a server-based WPS-PIN procedure, according to an embodiment of the present disclosure.

FIG. 5 illustrates another example block diagram for implementing a server-based WPS-PIN procedure 500, according to an embodiment of the present disclosure. The server-based WPS-PIN procedure 500 is similar to the server-based WPS-PIN procedure 400 of FIG. 4, except that the enrollee receives the home AP's credentials from the connected device (e.g., the provisioning AP) instead of the cloud server. The server-based WPS-PIN procedure 500 can be performed when the enrollee and connected device are associated with the same user account at the cloud server. For example, the connected device may have already been registered at the cloud server under the user account. The enrollee, when purchased, could have also been linked to the user account based on an identifier of the enrollee (e.g., its MAC address) added or on its registration under the user account. In the former case, the enrollee's registration can occur after the enrollee connects to the home AP.

As illustrated, the first ten steps of the server-based WPS-PIN procedure 500 are similar to those of the server-based WPS-PIN procedure 400. Upon completion of the tenth step, the home AP's credential can be transferred directly from the provisioning AP to the enrollee that then connects to the home AP. The twelfth and thirteenth step of the server-based WPS-PIN procedure 400 can be skipped.

In particular, the enrollee sends WPS probe requests that include device_info IEs encoding the encrypted PIN and authentication data, the provisioning AP passes the device_info IEs and enrollee's MAC address to the zero-touch registrar, the zero-touch registrar reports the device_info IEs and enrollee's MAC address to the cloud server over a secure channel, the cloud server verifies that the encrypted PIN and authentication data are valid and decrypts the encrypting PIN, the cloud server returns the PIN as decrypted, the zero-touch registrar requests the provisioning AP to enter a WPS-PIN active mode, the provisioning AP sends a WPS probe response to the enrollee, the enrollee associates to the provisioning AP, the provisioning AP and enrollee complete the M1~M8 registration protocol transactions, and the provisioning AP exits the WPS-PIN active mode. However, in the fifth step related to returning the decrypted PIN, upon detection that the enrollee and provisioning AP are associated with the same user account, the cloud server also returns instructions about providing the home AP's credentials directly to the home AP. Under the ninth step related to completing the M1~M8 registration protocol transactions, the provisioning AP can also transfer the home AP's credentials to the enrollee based on the instructions of the cloud server. After the provisioning AP exits the WPS-PIN active mode in the tenth step, the enrollee connects to the home AP directly in the eleventh step.

Figure 6:
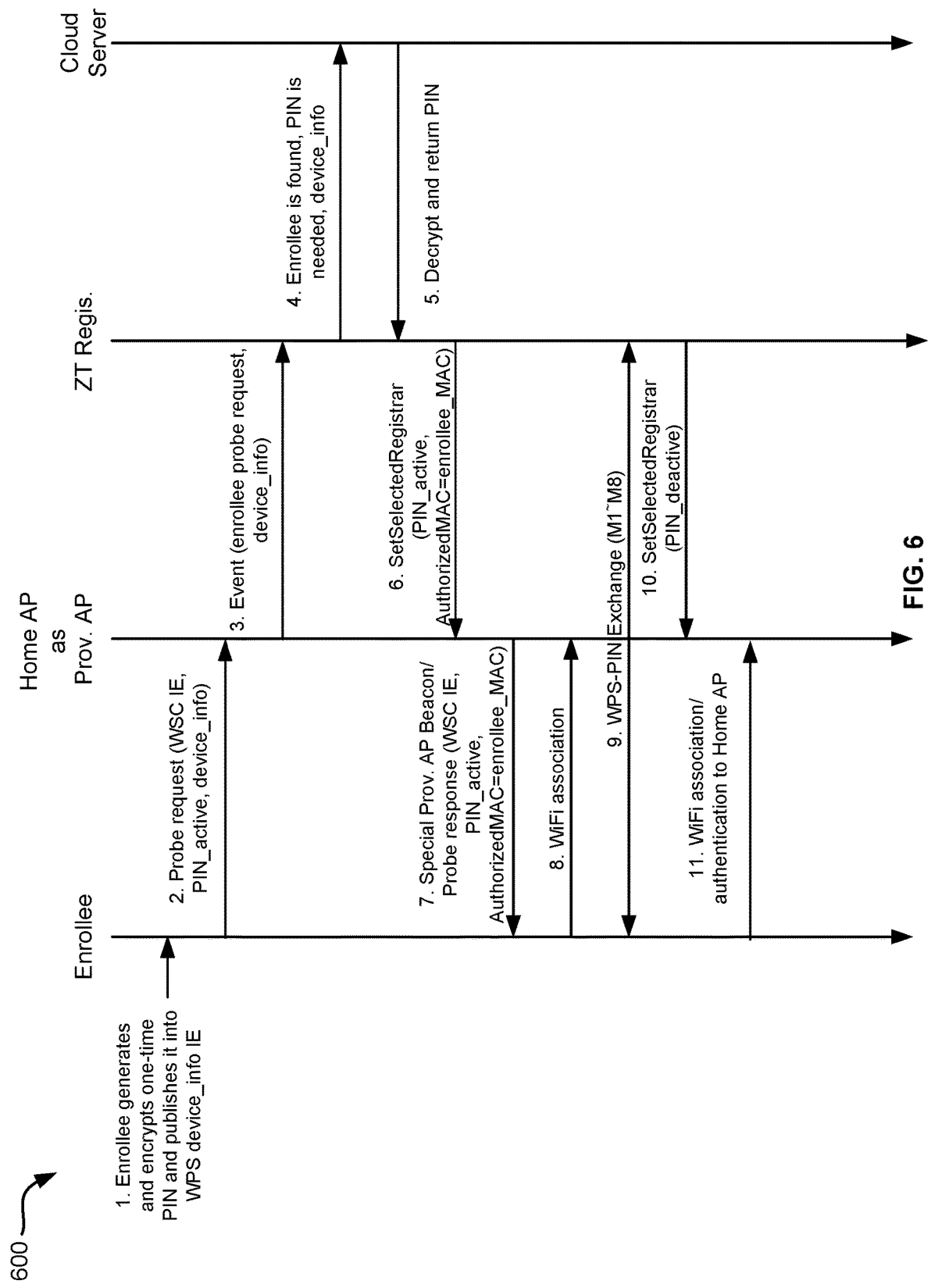
FIG. 6 illustrates yet another example block diagram for implementing a server-based WPS-PIN procedure, according to an embodiment of the present disclosure.

FIG. 6 illustrates yet another example block diagram for implementing a server-based WPS-PIN procedure 600, according to an embodiment of the present disclosure. The server-based WPS-PIN procedure 600 is similar to the server-based WPS-PIN procedure 500 of FIG. 5, except that the home AP includes the provisioning AP. Optionally, the home AP can include the zero-touch registrar or this registrar can be remote from and communicate with the home AP over a secure channel.

As illustrated, the steps of the server-based WPS-PIN procedure 600 are similar to those of the server-based WPS-PIN procedure 500. In particular, the enrollee sends WPS probe requests that include device_info IEs encoding the encrypted PIN and authentication data to the home AP, the home AP passes the device_info IEs and enrollee's MAC address to the zero-touch registrar, the zero-touch registrar reports the device_info IEs and enrollee's MAC address to the cloud server over a secure channel, the cloud server verifies that the encrypted PIN and authentication data are valid and decrypts the encrypting PIN, the cloud server returns the PIN as decrypted, the zero-touch registrar requests the home AP to enter a WPS-PIN active mode, the home AP sends a WPS probe response to the enrollee, the enrollee associates to the home AP, the home AP and enrollee complete the M1˜M8 registration protocol transactions, the home AP exits the WPS-PIN active mode, and the enrollee connects to the home AP directly. However, in the fifth step related to returning the decrypted PIN, the cloud server need not send instructions about providing the home AP's credentials directly to the enrollee. Under the ninth step related to completing the M1˜M8 registration protocol transactions, the home AP can also automatically transfer its credentials to the enrollee.

Figure 7:
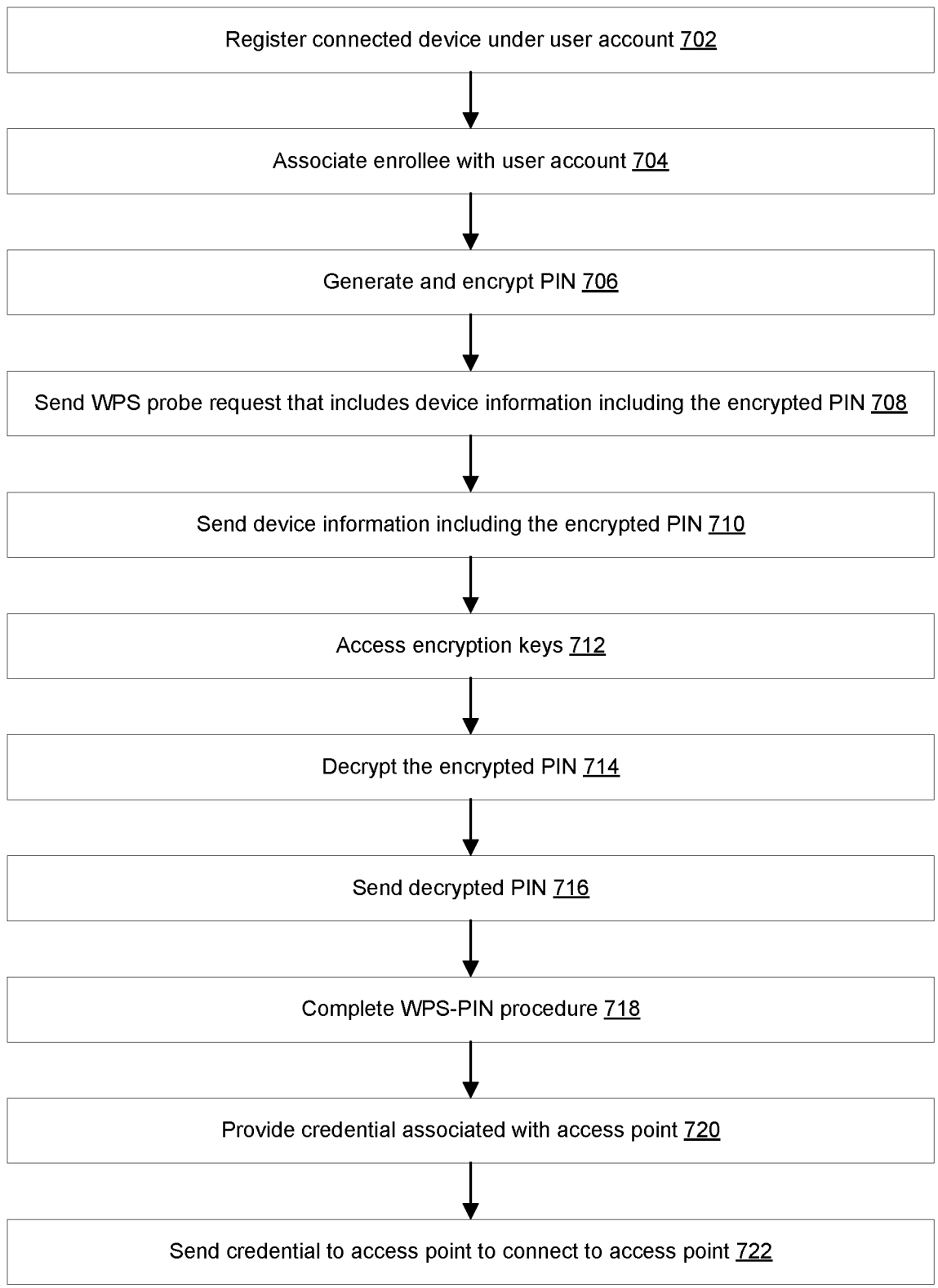
FIG. 7 illustrates an example flow for implementing a server-based WPS-PIN procedure, according to an embodiment of the present disclosure.

FIGS. 7-10 illustrate example flows for implementing a server-based WPS-PIN procedure. Devices are described as performing operations of the flows. Instructions for performing the operations can be stored as computer-readable instructions on non-transitory computer-readable media of the devices. As stored, the instructions represent programmable modules that include code or data executable by a processors of the devices. The execution of such instructions configures the devices to perform the specific operations shown in the figures and described herein. Each programmable module in combination with the respective processor represents a means for performing a respective operation(s). While the operations are illustrated in a particular order, it should be understood that no particular order is necessary and that one or more operations may be omitted, skipped, and/or reordered FIG. 7 illustrates an example flow for implementing a server-based WPS-PIN procedure, according to an embodiment of the present disclosure. Operations of the flow may be performed within a network environment that includes an enrollee, a connected device, a cloud server, and a home AP. As described herein above, different configurations of the network environment are possible. For instance, the connected device and the home AP can be different devices or the same device. Further, the connected device and the enrollee can be associated with a same user account or with a different user account. Variations to the operations of the example flow are noted herein below depending on the specific configuration of the network environment.

The example flow of FIG. 7 starts at operation 702, where the connected device is registered with a service provider under a user account. In an example, upon a purchase of the connected device, a purchase order is generated and a label of the connected device is scanned. The purchase order identifies the user account and the scan identifies the connected device (e.g., includes a read of the connected device's MAC address) and, optionally, a public key of the connected device. The cloud server updates the user account to include the identifier of the connected device and, optionally, the public key. In another example, the registration is performed after the connected device is set-up and becomes connected to a data network. In this example, the connected device can establish a secure connection to the cloud server, and can identify the user account and provide its identifier and public key to the cloud server that then updates the user account. Further, the connected device can provide credentials to the cloud server, where these credentials are those of the home AP to which the connected device is connected. In this case, the cloud server can also store the home AP's credentials under the user account. This example can apply to the network environment configuration where the connected device and the home AP are the same. In yet another example applicable to the network environment configuration where the zero-touch registrar is external to the connected device, operation 702 may be additionally or alternatively performed to register the zero-touch registrar under the user account.

At operation 704, the enrollee is associated with a user account. The user account can, but need not, be the same as the user account under which the connected device is registered. In an example, upon a purchase of the enrollee, a purchase order is generated and a label of the enrollee is scanned. The purchase order identifies the user account and the scan identifies the enrollee (e.g., includes a read of the enrollee's MAC address) and a public key of the enrollee. The cloud server updates the user account to include the identifier of the enrollee and, optionally, the enrollee's public key. In addition, a public key of the cloud server is loaded in the memory of the enrollee. In another example, during initial set-up where the enrollee connects to the connected device as part of the server-based WPS-PIN procedure, the enrollee can provide the user account's identifier and the enrollee's identifier and public key to the connected device than then passes them to the cloud server. The cloud server may also send its public key that the connected device then passes to the enrollee.

At operation 706, the enrollee generates and encrypts a PIN. In an example, upon power-up, the enrollee may enter a discovery mode for connecting to a WLAN. Accordingly, the enrollee generates a one-time PIN (e.g., an eight digit WPS PIN). In addition, the enrollee may generate a session key based on the cloud server's public key and the enrollee's private key (available from the enrollee's memory). The session key may be used to encrypt the one-time PIN, thereby generating an encrypted PIN. The enrollee may generate device information for a WPS probe request and may include the encrypted PIN in the device information.

At operation 708, the enrollee sends the WPS probe request that includes the device information to the connected device, where the device information includes the encrypted PIN. In an example, the enrollee broadcasts the WPS probe request over a Wi-Fi channel to the connected device. In the network environment configuration where the connected device and the home AP are the same, the WPS probe request is received by the home AP.

At operation 710, the connected device sends the device information to the cloud server. In an example, the connected device retrieves the device information from the WPS probe request. The connected device also establishes a secure connection to the cloud server and sends the device information and the enrollee's identifier (e.g., the enrollee's MAC address) to the cloud server over the secure channel. In the network environment configuration where the connected device and the home AP are the same, the home AP sends the device information.

At operation 712, the cloud server access encryption keys. In an example, the cloud server retrieve's the enrollee's public key from the user account associated with the enrollee based on the enrollee's identifier. The cloud server also retrieves its private key from memory.

At operation 714, the cloud server decrypts the encrypted PIN. In an example, the cloud server generates a session key based on the cloud server's private key and the enrollee's public key. The session key may be used to decrypt the encrypted PIN from the device information, thereby generating a decrypted PIN. This decrypted PIN should be the same as the one-time PIN (e.g., the eight digit WPS PIN) that was generated by the enrollee.

At operation 716, the cloud server sends the decrypted PIN. In an example, the decrypted PIN is sent over the secure connection to the connected device. Further, the cloud server may determine whether the user account associated with the enrollee and the user account under which the connected device is registered are the same or not. If the user accounts are the same, the cloud server can also send instructions to the connected device, where these instructions request the connected device to provide the home AP's credentials directly from the connected device's local memory. In the network environment configuration where the connected device and the home AP are the same, the decrypted PIN is sent to the home AP instead. Further, the cloud server need not check the user account(s). Instead, the home AP may assume that its credentials should be transferred directly to the connected device.

At operation 718, the connected device and the enrollee complete the WPS-PIN procedure of the WPS protocol. In an example, the two devices complete a WPS-PIN message exchange (e.g., the M1~M8 registration protocol transactions). During the exchange of messages M1~M8, the connected device and the enrollee authenticate each other using the decrypted PIN as the enrollee's password. If the connected device does not have instructions from the cloud server to pass the home AP's credentials, the connected device may pass the connected device's credentials to the enrollee instead. In this case, the enrollee may access the WLAN through the connected device and establish a secure connection to the cloud server. In the network environment configuration where the connected device and the home AP are the same, the WPS-PIN procedure is completed with the home AP.

At operation 720, the connected device provides a credential associated with the home AP to the enrollee. In the network environment configuration where the same user accounts are used, the connected device may retrieve the home AP's credentials (e.g., SSID and passphrase) from the connected device's local memory based on the cloud server's instructions and send them to the enrollee. In the network environment configuration where different user accounts are used, the connected device passes the home AP's credentials received from the cloud server to the enrollee over the secure connection. In the network environment configuration where the connected device and the home AP are the same, the home AP sends its credentials to the enrollee directly.

At operation 722, the enrollee sends the credential associated with the access point to the access point to gain access to the WLAN. In an example, the enrollee establishes a wireless connection to the home AP by associating and authenticating itself to the home AP (e.g., by looking for an access point that has the home AP's SSID, requesting a connection thereto, and providing the passphrase). In the network environment configuration where the connected device and the home AP are the same, the enrollee may need to simply send the passphrase.

Figure 8:
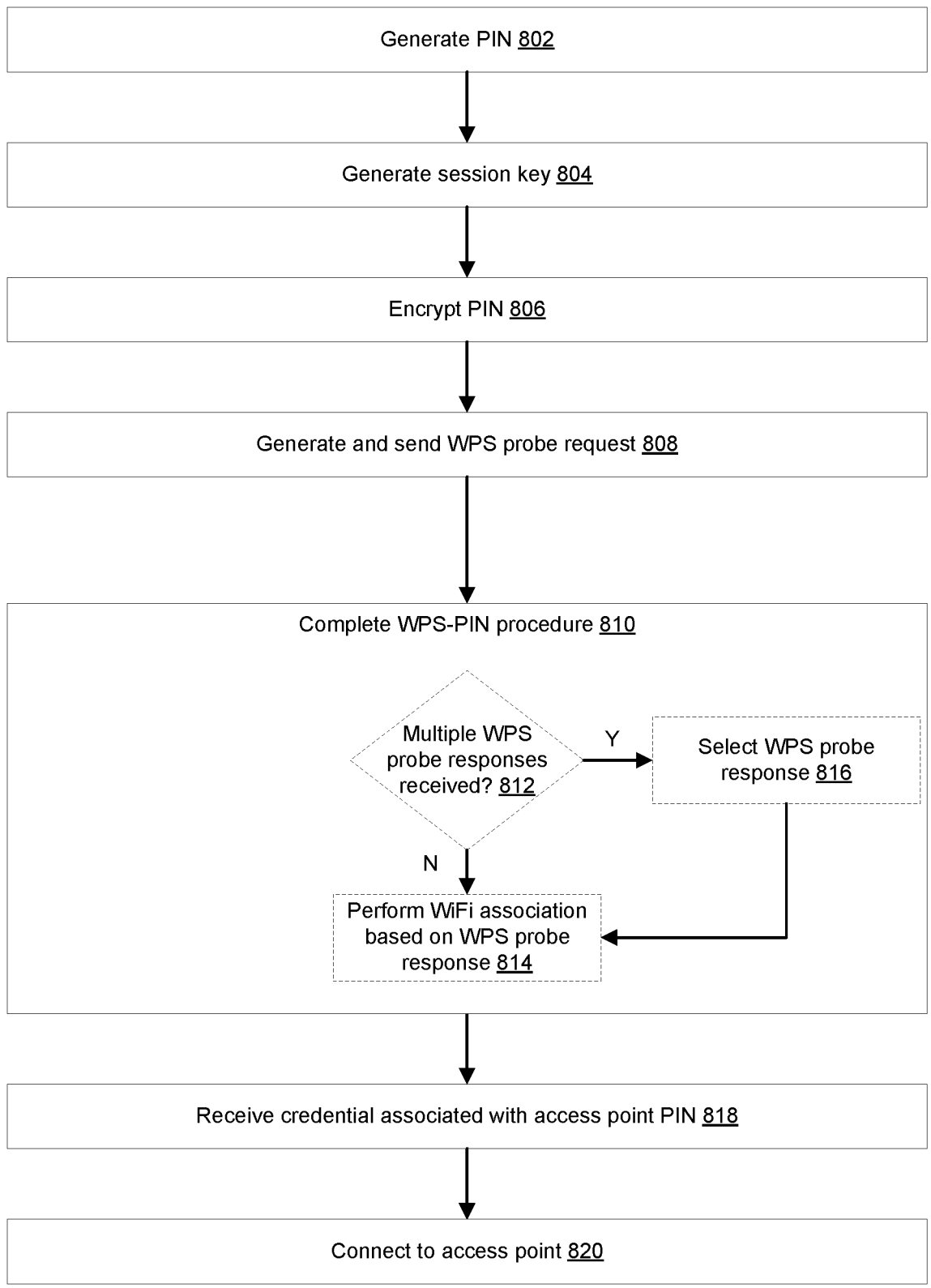
FIG. 8 illustrates an example flow implemented by an enrollee device in support of a server-based WPS-PIN procedure, according to an embodiment of the present disclosure.

FIG. 8 illustrates an example flow implemented by an enrollee device in support of a server-based WPS-PIN procedure, according to an embodiment of the present disclosure. The enrollee may already be associated with a user account at a cloud server and may have established a communication link to a connected device. Operations of this example flow may be implemented as sub-operations of some of the operations of the example flow of FIG. 7.

The example flow starts at operation 802, where the enrollee generates a PIN. In an example, the enrollee generates a one-time eight digit WPS PIN.

At operation 804, the enrollee generates a session key. In an example, the enrollee generates a shared key based on the enrollee's private key and the cloud server's public key by using an elliptic curve integrated encryption scheme. For instance, the enrollee may call an Elliptic Curve Diffie Hellman (ECDH) crypto primitive, where the shared key is computed as ECDH_compute_key(enrollee's private key, cloud server's public key).

At operation 806, the enrollee encrypts the PIN based on the cloud server's public key and the enrollee's public key. In an example, the enrollee encrypts the PIN with the session key. For instance, the elliptic curve integrated encryption scheme includes additional crypto primitives for symmetric encryption and message authentication, hashing, and ASCII encoding. These primitives are called to generate an ASCII string that encodes the encrypted PIN and authentication data.

At operation 808, the enrollee generates and sends a WPS probe request to the connected device (or a home AP depending on the network environment configuration). In an example, the WPS probe request includes device information according to the WPS device_info IE structure. The device information includes the ASCII string that encodes the encrypted PIN and the authentication data. The WPS probe request can be sent in a broadcast during a discovery phase.

At operation 810, the enrollee completes a WPS-PIN procedure of the WPS protocol with the connected device (or the home AP depending on the network environment configuration). In an example, the enrollee receives a WPS probe response, associates to the connected device, and participates in the M1~M8 registration protocol transactions. In the network environment configuration where the enrollee is associated with a user account different from the one under which the connected device is registered, the enrollee may also receive the credentials of the connected device, request a connection thereto, and provide the connected device's passphrase to gain access to the data network through the connected device. Further, the enrollee may establish a secure connection to the cloud_server through the connected device and over the data network.

In an example, the enrollee may be within Wi-Fi range of multiple connected devices (and/or home APs). Accordingly, the WPS probe request may be broadcast to these connected devices and the enrollee may receive one or more WPS probe responses to its broadcast. In this example, operation 810 may include multiple sub-operations 812-816.

At sub-operation 812, the enrollee may determine whether multiple WPS probe responses were received from multiple connected devices (and/or home APs). If not, sub-operation 814 follows sub-operation 812. Otherwise, sub-operation 816 can be performed.

At sub-operation 814, the enrollee has received a WPS probe response from only one connected device. Accordingly, the enrollee performs a Wi-Fi association to that connected device.

At sub-operation 816, the enrollee has received WPS probe responses from multiple connected devices (and/or home APs). Accordingly, the enrollee selects one of the connected devices (and/or home APs, or equivalently to select one of the WPS probe responses) to then perform sub-operation 814 and associate with the selected device. The enrollee may determine and use one or more factors to perform the selection or the selection may be random. These factors may include signal strength, timing, and user preferences. For instance, the enrollee may select the device corresponding to the WPS probe response having the highest signal strength. In another illustration, the enrollee may select the device corresponding to the WPS probe response that was received first. In yet another illustration, the enrollee may select the device identified in a preference list in the user preferences (which can be stored locally at the enrollee).

At operation 818, the enrollee receives a credential associated with the home AP of the WLAN. In the network environment configuration where the same user accounts are used, the enrollee may receive the home AP's SSID and passphrase directly from the connected device. In the network environment configuration where different user accounts are used, the connected device receives the home AP's SSID and passphrase from the cloud server over the secure connection established via the connected device. In the network environment configuration where the connected device and the home AP are the same, the enrollee receives the home AP's passphrase directly from the home AP.

At operation 820, the enrollee connects to the home AP. In an example, the enrollee uses the credentials to establish the wireless communication to the home AP. For instance, the enrollee searches for the home AP based on the SSID as applicable, requests a connection thereto, and provides the passphrase.

Although the example flow of FIG. 8 is described in connection with a single cloud server, the embodiments of the present disclosure are not limited as such. Instead, the example flow of FIG. 8 similarly applies to a network environment that includes multiple cloud servers. Some or all of the cloud servers may be managed by different service providers. In this example, the enrollee may store multiple public keys, one for each of the cloud servers. Different techniques may be available to encrypt a one-time PIN given the availability of multiple public keys. In one technique, enrollee may select one of the public keys for encrypting the PIN. In this case, the selection may be random or may be based on a predefined priority, service provider or user preferences, service provider agreements. The encrypted PIN may be included in the WPS probe request and may be sent to all the cloud servers. Only the cloud server capable of decrypting the encrypted PIN (e.g., based on the corresponding private key of the cloud server) may respond back with the decrypted PIN. Alternatively, the enrollee may also include information about the used public key and/or the corresponding cloud server in the WPS probe request. In this case, the connected device may send the encrypted PIN to only that cloud server.

In another technique, the enrollee performs multiple encryptions to generate multiple encrypted versions of the same PIN under operation 806. Each version can correspond to a cloud server, where the encryption of the PIN in the version relies on the public key of the cloud server. The enrollee may add the multiple encrypted versions to a single WPS probe request or may include each of the encrypted versions in a different WPS probe request. In both cases, the encrypted PINs may be sent to the connected device in the WPS probe request(s), under operation 808. In response, the enrollee may receive one or more WPS probe responses based on processing of the WPS probe request(s) and/or encrypted PINs. In one example, the enrollee may receive multiple WPS probe responses and select one of them, as illustrated under operation 816. Each of these responses may correspond to a decrypted PIN from a cloud server. In another example, the enrollee may receive a single WPS probe response that corresponds to a decrypted PIN from one of the cloud servers. In this case, a selection may have been made at the connected device and/or the cloud servers about the cloud server that should respond with the decrypted PIN. In one illustration, the connected device may include a set of rules for sending the encrypted PINs to the different cloud servers, selecting a subset of these servers to send the encrypted PINs thereto, and/or selecting a decrypted PIN from decrypted PINs received back from the cloud servers. In another illustration, each of the cloud server may include a set of rules to respond to an encrypted PIN originating from the enrollee. In yet another illustration, the cloud servers may exchange data about the enrollee (e.g., to inform each other that the enrollee is involved in a server-based WPS-PIN procedure) or a management server may receive the data from the cloud servers to apply the set of rules. Generally, the set of rules can specify a random selection or a selection based on a predefined priority, service provider or user preferences, service provider agreements, signal strengths related to processing requests (e.g., signal strengths of WPS probe requests received by the connected device or each encrypted PIN received by a cloud server), and/or timing of the processing requests.

Furthermore, although the example flow of FIG. 8 is described in connection with credentials of a single home AP, the embodiments of the present disclosure are not limited as such. Instead, the example flow of FIG. 8 similarly applies to receiving credentials of multiple home APs. In this case, the connected device may provide the credentials to the enrollee, and the enrollee may select one of the home APs to connect thereto. The selection can be random or can based on a predefined priority, service provider or user preferences, service provider agreements, signal strengths of connections to the home APs.

Figure 9:
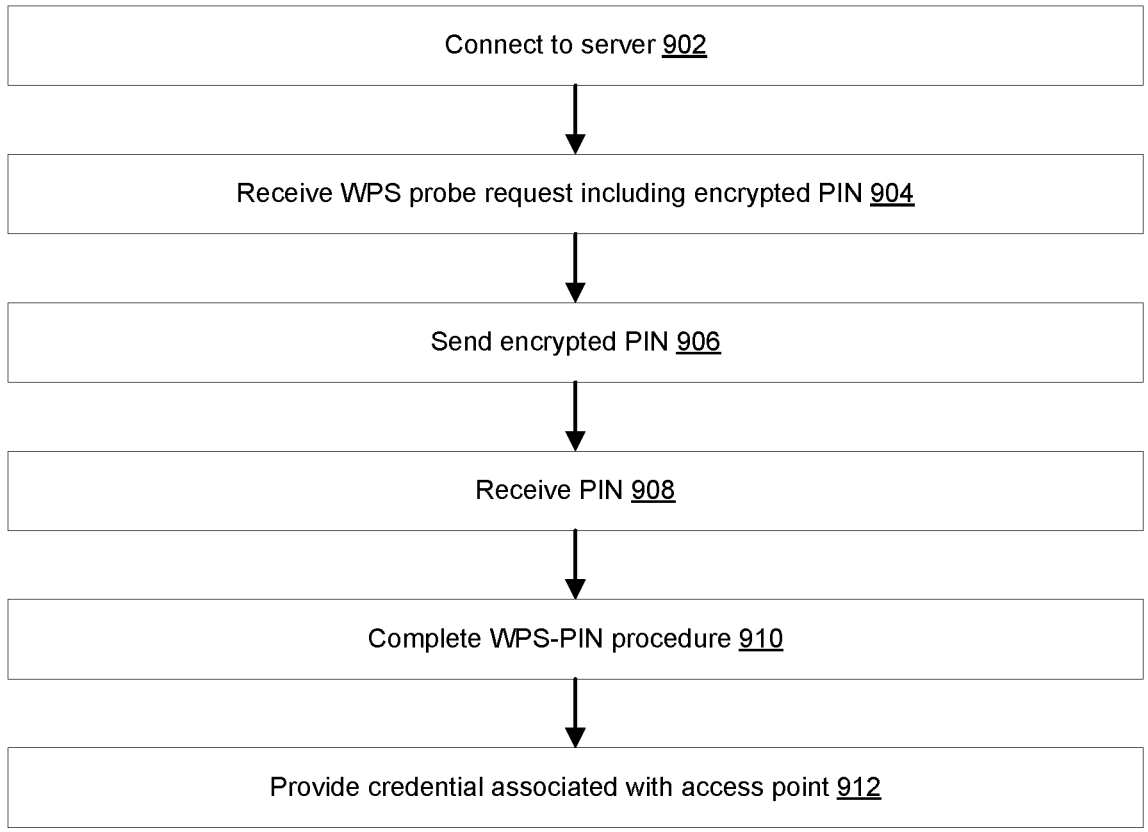
FIG. 9 illustrates an example flow implemented by a connected device in support of a server-based WPS-PIN procedure, according to an embodiment of the present disclosure.

FIG. 9 illustrates an example flow implemented by a connected device in support of a server-based WPS-PIN procedure, according to an embodiment of the present disclosure. Operations of this example flow may be implemented as sub-operations of some of the operations of the example flow of FIG. 7. The connected device includes a provisioning AP. In addition, the connected device may include a zero-touch registrar or the zero-touch registrar may be external to the connected device. Further, the connected device and a home AP may be the same. Variations to the operations of the example flow are noted herein below depending on the specific configuration of the connected device. Generally, the connected device is registered under a user account at a cloud server.

The example flow of FIG. 9 starts at operation 902, where the connected device connects to the cloud server. In an example, the connection is over a data network via the home AP and includes a secure channel (e.g., a TLS/SSL tunneled connection).

At operation 904, the connected device receives a WPS probe request that includes an encrypted PIN. In an example, this request is received by the provisioning AP from an enrollee as part of a discovery method of a server-based WPS-PIN procedure and includes device information according to a WPS device_info IE structure. The device information contains an ASCII string that encodes the encrypted PIN and authentication data.

At operation 906, the connected device sends the encrypted PIN to the cloud server. In an example, the provisioning AP detects the WPS probe request and sends the device information and an identifier of the enrollee (e.g., the enrollee's MAC address) to the zero-touch registrar. In turn, the zero-touch registrar reports the device info and the enrollee's identifier to the cloud. In the network environment configuration where the connected device includes both the provisioning AP and the zero-touch registrar, the device info and the enrollee's identifier are reported to the cloud server over the secure connection. In the network environment configuration where the zero-touch registrar is external to the connected device, the device info and the enrollee's identifier are sent from the provisioning AP to the zero-touch registrar over a first connection that uses a private protocol, such as a universal plug and play (UPnP) protocol, and from the zero-touch registrar to the cloud server over a secure connection (e.g., a TLS/SSL tunneled connection) if the zero-touch registrar is not hosted on the cloud server. These types of communications are also applicable when the connected device and the home AP are the same. In addition to receiving the PIN, the connected device may further receive instructions from the cloud server to provide the credentials of the home AP directly to the enrollee. These instructions may be generated by the cloud server based on a determination that the enrollee is associated with the same user account as the one under which the connected device is registered.

At operation 908, the connected device receives a PIN, where this PIN is a decrypted PIN generated by the cloud server by decrypting the encrypted PIN that was sent from the connected device. In an example, the zero-touch registrar receives and passes the PIN to the provisioning AP along with a request to start a WPS-PIN procedure of the WPS protocol with the enrollee. The PIN can be received and passed over the same connection(s) that were used for the transmission out to the cloud server under operation 906, depending on the network environment configuration.

At operation 910, the connected device completes the WPS-PIN procedure with the enrollee. In an example, the provisioning AP enters a WPS-PIN active mode, sends a WPS probe response to the enrollee, participates in the M1~M8 registration protocol transactions to thereby authenticate the enrollee based on the decrypted PIN, and exits the WPS-PIN active mode. In the network environment configuration where the enrollee is associated with a user account different from the one under which the connected device is registered, the connected device may also send its credentials to the enrollee and, upon proper association and authentication, may establish a secure wireless TCP/IP connection to the enrollee and a secure TCP/IP connection to the cloud server, thereby providing the enrollee access to the server over the two connections.

At operation 912, the connected device provides a credential associated with the home AP to the enrollee based on the WPS-PIN message exchange (e.g., upon the authentication of the enrollee). Once the credential is provided, the connected device can terminate the secure wireless TCP/IP connection to the enrollee. In the network environment configuration where the same user accounts are used, the connected device may send the home AP's SSID and passphrase directly to the enrollee from the connected device's local memory over the secure wireless TCP/IP connection. In the network environment configuration where different user accounts are used, the connected device receives the home AP's SSID and passphrase from the cloud server over the secure TCP/IP connection and passes it over the secure wireless TCP/IP connection to the enrollee. In the network environment configuration where the connected device and the home AP are the same, the home AP's sends directly the passphrase to the enrollee over the secure wireless TCP/IP connection.

Although the example flow of FIG. 9 is described in connection with a single cloud server, the embodiments of the present disclosure are not limited as such. Instead, the example flow of FIG. 9 similarly applies to a network environment that includes multiple cloud servers. Some or all of the cloud servers may be managed by different service providers. As described herein above in connection with FIG. 8, the connected device may receive a WPS probe request including an one-time PIN encrypted with a public key of a cloud server and information about the cloud server. In this case, the connected device sends the encrypted PIN to the cloud server and receives a decrypted PIN back from the cloud server. Alternatively, the connected device may receive a single WPS probe request that includes multiple encrypted versions of a PIN, or multiple WPS probe requests each of which including a single encrypted version. In this case, the connected device may either apply a set of rules and select a set of the cloud servers or may send the encrypted versions to the cloud servers. When multiple encrypted versions are sent, the connected device may in turn receive either a single decrypted PIN from a cloud server or multiple decrypted PINs from different cloud servers. The single decrypted PIN may be received based on a selection by the cloud server(s) for the decryption. In comparison, upon receiving multiple decrypted PINs, the connected device may apply the set of rules to select one of them or may send different WPS probe responses to the enrollee. Generally, the set of rules can specify a random selection or a selection based on a predefined priority, service provider or user preferences, service provider agreements, signal strengths related to processing requests (e.g., signal strengths of WPS probe requests received by the connected device or each encrypted PIN received by a cloud server), and/or timing of the processing requests.

Furthermore, although the example flow of FIG. 9 is described in connection with credentials of a single home AP, the embodiments of the present disclosure are not limited as such. Instead, the example flow of FIG. 9 similarly applies to credentials of multiple home APs. In one example, the connected device may provide the credentials of the different home APs to the enrollee, select one of the home APs and provide its credentials to the enrollee, or receive a selection from a cloud server and provide the credentials of the selected home AP to the enrollee. The selection can be random or can based on a predefined priority, service provider or user preferences, service provider agreements, signal strengths of connections to the home APs.

Figure 10:
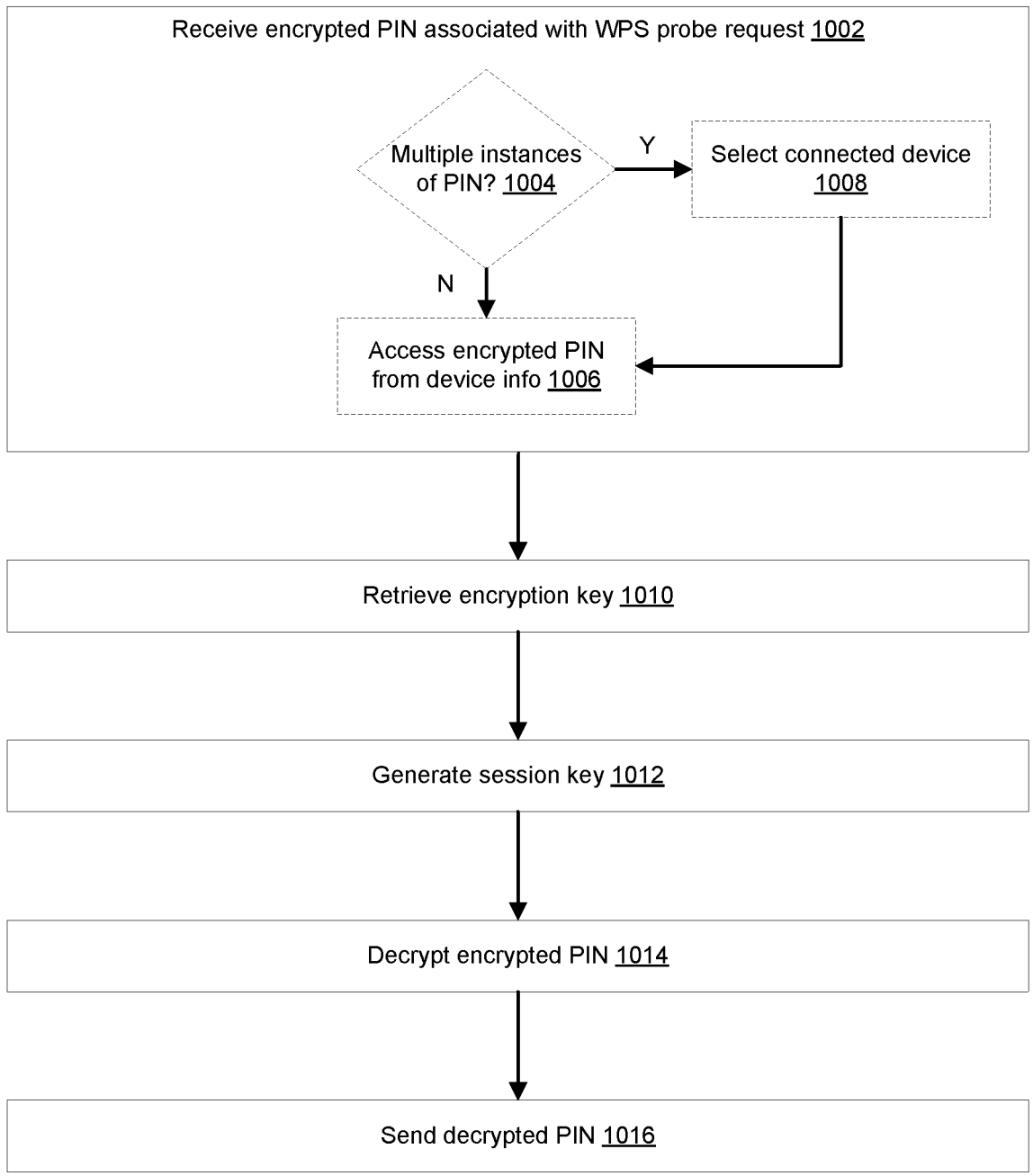
FIG. 10 illustrates an example flow implemented by a cloud server in support of a server-based WPS-PIN procedure, according to an embodiment of the present disclosure.

FIG. 10 illustrates an example flow implemented by a cloud server in support of a server-based WPS-PIN procedure, according to an embodiment of the present disclosure. Operations of this example flow may be implemented as sub-operations of some of the operations of the example flow of FIG. 7. The cloud server may store or have access to a user account under which a connected device is registered and a user account associated with an enrollee. These user accounts may be the same or may be different. In addition, the cloud server may host a zero-touch registrar. Variations to the operations of the example flow are noted herein below depending on the specific configuration of the cloud server.

The example flow starts at operation 1002, where the cloud server receives an encrypted PIN associated with a WPS probe request. In an example, the cloud server receives device information from the connected device, where the device information follows a WPS device_info IE structure and includes an ASCII string that encodes the encrypted PIN and authentication data. In addition, the cloud server may receive an identifier of the enrollee's (e.g., the enrollee's MAC address). Generally, the device information and the enrollee's identifier are received from the zero-touch registrar where this registrar can be remote from the cloud server (in which case the device information is received over a secure connection) or local to the cloud server.

In an example, the enrollee may be within Wi-Fi range of multiple connected devices (and/or home APs). Accordingly, a WPS probe request broadcasted by the enrollee may have been received by more than one connected device (and/or home AP). Each of such devices may have sent the device info separately to the cloud server. Accordingly, the cloud server may have received multiple instances of the encrypted PIN. In this example, operation 1002 may include multiple sub-operations 1004-1008.

At sub-operation 1004, the cloud server may determine whether multiple instances of the encrypted PIN were received from multiple connected devices (and/or home APs). If not, sub-operation 1006 follows sub-operation 1004. Otherwise, sub-operation 1008 can be performed.

At sub-operation 1006, the cloud server has received the encrypted PIN from only one connected device. Accordingly, the cloud server accesses the encrypted PIN from the received device info.

At sub-operation 1008, the cloud server has received instances of the encrypted PIN from multiple connected devices (and/or home APs). Accordingly, the cloud server selects one of the instances (or, equivalently, one of one of the connected devices and/or home APs) to then perform sub-operation 1006 and access the encrypted PIN. The cloud device may use one or more factors to perform the selection or the selection may be random. These factors may include signal strength, timing, user accounts, and user preferences. For instance, the cloud server may also receive information about the signal strength of each WPS probe request received by the corresponding connected device (or home AP). The cloud server can select the instance corresponding to the WPS probe request having the highest signal strength. In another illustration, the cloud server may select the instance of the encrypted device (or the device information) that was received first. In yet another illustration, the cloud server may select the instance received from a connected device (or home AP) identified in a preference list in the user preferences (which can be stored locally at the cloud server). In a further illustration, the cloud server may select the instance received from a connected device (or home AP) that is registered under the same account associated with the enrollee.

At operation 1010, the cloud server retrieves an encryption key of the enrollee. In an example, the cloud server accesses the user account associated with the enrollee, where this access is based on the received identifier of the enrollee. The user account stores the enrollee's public key. Accordingly, the cloud server accesses the public key from the user account.

At operation 1012, the cloud server generates a session key based on the cloud server's private key and the enrollee's public key. In an example, the cloud server generates a shared key based on the private and public keys by using an elliptic curve integrated encryption scheme. For instance, the cloud server may call an Elliptic Curve Diffie Hellman (ECDH) crypto primitive, where the shared key is computed as ECDH_compute_key(cloud server's private key, enrollee's public key).

At operation 1014, the cloud server decrypts the encrypted PIN based on the session key to generate a PIN. In an example, this PIN is a one-time eight digit WPS-PIN that should be the same as the one generated by the enrollee. For instance, the elliptic curve integrated encryption scheme includes additional crypto primitives for symmetric decryption and message verification, hashing, and ASCII decoding. These primitives are called to decode the encrypted PIN and authentication data from the ASCII string, verify that the encrypted PIN and authentication data are valid, and decrypt the encrypted PIN.

At operation 1016, the cloud server sends the decrypted PIN to the connected device. In addition, the cloud server may determine whether the user account associated with the enrollee and the user account under which the connected device is registered are the same or not. If the user accounts are the same, the cloud server can also send instructions to the connected device, where these instructions request the connected device to send the home AP's credentials to the enrollee directly from the connected device's local memory. Generally, the decrypted PIN and, as applicable, the instructions are provided to the zero-touch registrar for forwarding to the provisioning AP.

Although the example flow of FIG. 10 is described in connection with credentials of a single home AP, the embodiments of the present disclosure are not limited as such. Instead, the example flow of FIG. 10 similarly applies to credentials of multiple home APs. In one example, the cloud server may select one of the home APs and the credentials of the selected home AP may be provided to the enrollee. The selection can be random or can based on a predefined priority, service provider or user preferences, service provider agreements, signal strengths of connections to the home APs.

Figure 11:
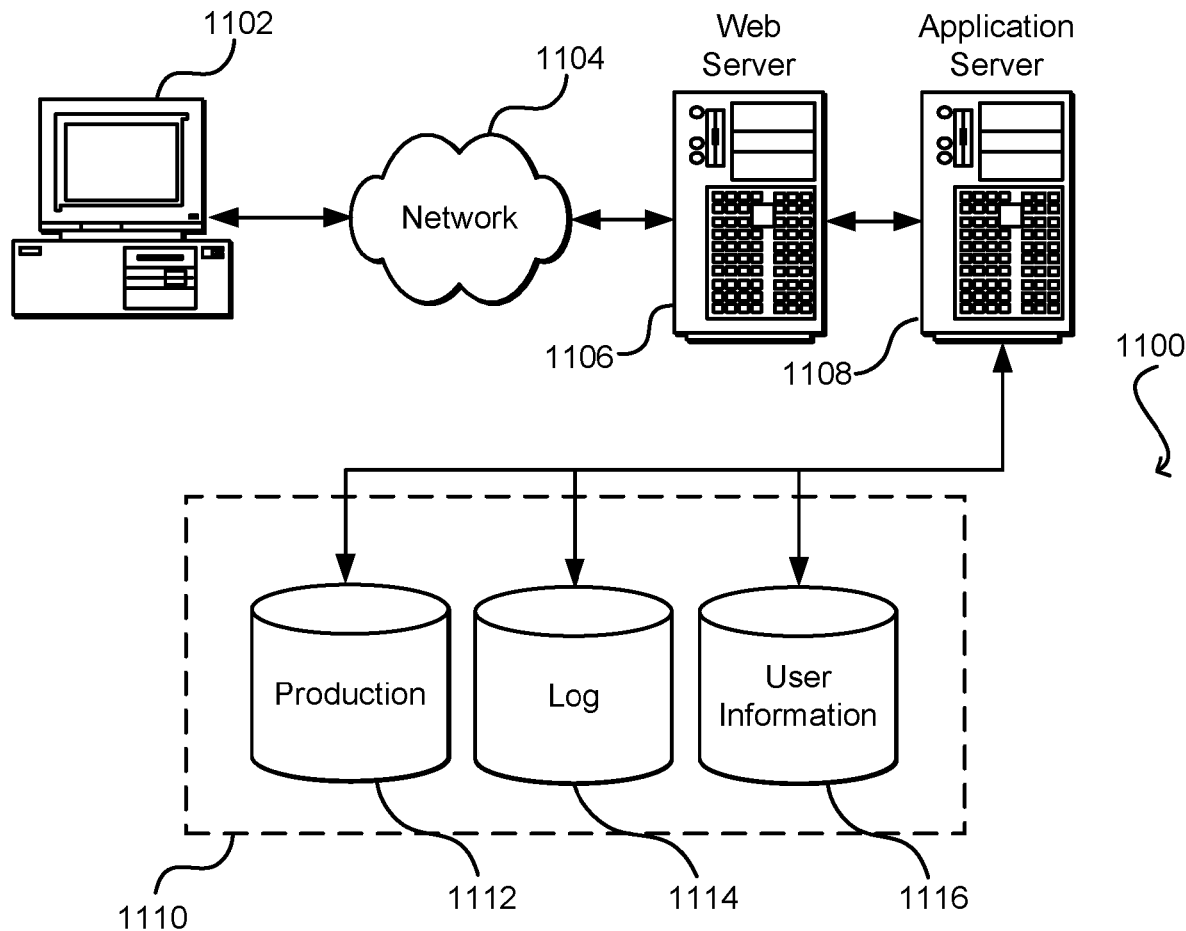
FIG. 11 illustrates a computer architecture diagram showing an example computer architecture, according to an embodiment of the present disclosure.

FIG. 11 illustrates a computer architecture diagram showing an example computer architecture, according to an embodiment of the present disclosure. This architecture may be used to implement some or all of the systems described herein. The computer architecture shown in FIG. 11 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein.

The computer 1100 includes a baseboard 1102, or "motherboard," which is a printed circuit board to which a multitude of components or devices may be connected by way of a system bus or other electrical communication paths. In one illustrative embodiment, one or more central processing units ("CPUs") 1104 operate in conjunction with a chipset 1106. The CPUs 1104 may be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 may provide an interface to a random access memory ("RAM") 1108, used as the main memory in the computer 1100. The chipset 1106 may further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM may also store other software components necessary for the operation of the computer 1100 in accordance with the embodiments described herein.

The computer 1100 may operate in a networked environment using logical connections to remote computing devices and computer systems through a network, such as the local area network 1120. The chipset 1106 may include functionality for providing network connectivity through a NIC 1112, such as a gigabit Ethernet adapter. The NIC 1112 is capable of connecting the computer 1100 to other computing devices over the network 1120. It should be appreciated that multiple NICs 1112 may be present in the computer 1100, connecting the computer to other types of networks and remote computer systems.

The computer 1100 may be connected to a mass storage device 1118 that provides non-volatile storage for the computer. The mass storage device 1118 may store system programs, application programs, other program modules, and data, which have been described in greater detail herein. The mass storage device 1118 may be connected to the computer 1100 through a storage controller 1114 connected to the chipset 1106. The mass storage device 1118 may consist of one or more physical storage units. The storage controller 1114 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1118 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1118 is characterized as primary or secondary storage, and the like.

For example, the computer 1100 may store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1118 by detecting the physical states or characteristics of one or more particular locations within the physical storage units.

In addition to the mass storage device 1118 described above, the computer 1100 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1100.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1118 may store an operating system 1130 utilized to control the operation of the computer 1100. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1118 may store other system or application programs and data utilized by the computer 1100. The mass storage device 1118 might also store other programs and data not specifically identified herein.

In one embodiment, the mass storage device 1118 or other computer-readable storage media is encoded with computer-executable instructions which, when loaded into the computer 1100, transforms the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various routines described above. The computer 1100 might also include computer-readable storage media for performing any of the other computer-implemented operations described herein.

The computer 1100 may also include one or more input/output controllers 1116 for receiving and processing input from a number of input devices, such as a keyboard, a mouse, a touchpad, a touch screen, an electronic stylus, or other type of input device. Similarly, the input/output controller 1116 may provide output to a display, such as a computer monitor, a flat-panel display, a digital projector, a printer, a plotter, or other type of output device. It will be appreciated that the computer 1100 may not include all of the components shown in FIG. 11, may include other components that are not explicitly shown in FIG. 11, or may utilize an architecture completely different than that shown in FIG. 11. It should also be appreciated that many computers, such as the computer 1100, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
    a server of a service provider, the server being associated with a first private key and a first public key;
    a first computing device configured to communicate with the server over a data network via an access point, the first computing device registered with the service provider; and
    a second computing device associated with a second private key and a second public key, the second computing device storing the first public key,
    wherein a process to establish wireless communication between the second computing device and the access point comprises:
        establishing a communication link between the first computing device and the second computing device,
        generating, by the second computing device, a one-time personal identification number (PIN),
        encrypting, by the second computing device using the first public key and the second private key, the one-time PIN to generate an encrypted PIN,
        sending, by the second computing device to the first computing device, a Wi-Fi protected setup (WPS) probe request that comprises device information of the second computing device, the device information comprising the encrypted PIN,
        sending, by the first computing device to the server via the access point, the device information,
        decrypting, by the server using the first private key and the second public key, the encrypted PIN to generate a decrypted PIN,
        sending, by the server to the first computing device, the decrypted PIN,
        performing, by the first computing device and the second computing device, a WPS-PIN message exchange to authenticate the second computing device based at least in part on the decrypted PIN,
        providing, by the first computing device to the second computing device based at least in part on the authenticating, a credential associated with the access point, and
        using, by the second computing device, the credential to establish the wireless communication to the access point.

2. The system of claim 1, wherein the process further comprises:
    receiving, by the server from the first computing device, a media access control (MAC) address of the second computing device; and
    retrieving, by the server, the second public key from a registration database based at least in part on the MAC address.

3. The system of claim 1, wherein decrypting the encrypted PIN comprises:
    generating, by the server, a symmetric session key based at least in part on the first private key and the second public key; and
    decrypting the encrypted PIN based at least in part on the symmetric session key.

4. A method comprising:
    generating, by a first computing device, a personal identification number (PIN) associated with a Wi-Fi Protected Setup (WPS) PIN procedure;
    encrypting, by the first computing device, the PIN to generate an encrypted PIN based at least in part on a public key associated with a server;

sending, from the first computing device to a second computing device that is communicatively coupled with the server via an access point, a WPS probe request that comprises the encrypted PIN;

sending, from the second computing device to the server, the encrypted PIN;

receiving, by the second computing device from the server, the PIN;

receiving, by the first computing device from the second computing device, a credential associated with the access point; and establishing, by the first computing device, a connection to the access point using the credential.

5. The method of claim 4, wherein the PIN is valid for a fixed duration of time.

6. The method of claim 4, wherein the credential is received by at least:

establishing, by the first computing device, secure communication with the server via the second computing device; and receiving, by the first computing device from the server over the secure communication, a service set identifier (SSID) of the access point and a passphrase associated with connecting to the access point.

7. The method of claim 4, further comprising:

generating, by the first computing device, a second encrypted PIN based at least in part on a second public key associated with a second server; and sending, by the first computing device to the second computing device, the second encrypted PIN in the WPS probe request.

8. The method of claim 4, wherein encrypting the PIN comprises:

generating a session key by inputting the public key associated with the server and a private key associated with the first computing device to an elliptic curve integrated encryption scheme (ECIES); and generating the encrypted PIN based at least in part on the session key.

9. The method of claim 8, further comprising generating, by the first computing device, authentication data based at least in part on the ECIES, wherein the WPS probe request comprises the encrypted PIN and the authentication data.

10. The method of claim 4, further comprising:

sending, by the first computing device, the WPS probe request to a plurality of computing devices that are communicatively coupled with the server and that comprise the second computing device;

receiving, by the first computing device, a WPS probe response to the WPS probe request from the second computing device only; and performing, by the first computing device, a WPS-PIN message exchange with the second computing device based at least in part on the WPS probe request, wherein the credential is received based at least in part on the WPS-PIN message exchange.

11. The method of claim 4, further comprising:

sending, by the first computing device, the WPS probe request to a plurality of computing devices that are communicatively coupled with the server and that comprise the second computing device;

receiving, by the first computing device, a plurality of WPS probe responses to the WPS probe request from the plurality of computing devices; and sending, by the first computing device, a request for the credential to the second computing device.

12. The method of claim 11, wherein sending the request is sent based at least in part on determining at least one of a signal strength associated with a WPS probe response of the second computing device, a timing of receiving the WPS probe response, or a user preference.

13. A device comprising:

one or more processors;

one or more non-transitory computer-readable storage media storing instructions, that upon execution by the one or more processors, configure the device to perform operations that comprise:

connecting to a server via an access point, the server configured to decrypt an encrypted personal identification number (PIN) based at least in part on a public key of a computing device;

receiving, from the computing device, a Wi-Fi protected setup (WPS) probe request comprising the encrypted PIN, the encrypted PIN being encrypted based at least in part on a public key of the server;

sending the encrypted PIN to the server;

receiving a PIN from the server based at least in part on a decryption of the encrypted PIN by the server; and providing, to the computing device, a credential associated with the access point based at least in part on the PIN.

14. The device of claim 13, wherein providing the credential comprises sending, to the computing device, the credential from a plurality of credentials corresponding to a plurality of access points a predefined priority, wherein the credential is sent based at least in part on a signal strength of a connection between the device and the access point.

15. The device of claim 13, wherein the operations further comprise:

retrieving a second encrypted PIN from the WPS probe request, the second encrypted PIN being encrypted based at least in part on a second public key of a second server;

sending the second encrypted PIN to the second server;

receiving a second PIN from the second server; and authenticating the computing device based at least in part on the PIN instead of the second PIN.

16. The device of claim 13, wherein the operations further comprise:

retrieving device information from the WPS probe request, the device information comprising the encrypted PIN; and sending the device information to the server over a secure connection.

17. The device of claim 13, wherein the device comprises a provisioning access point, wherein the provisioning access point is configured to forward the WPS probe request to a remote registrar and receive the PIN from the remote registrar based at least in part on a universal plug and play (UPnP) protocol.

18. The device of claim 17, wherein the operations further comprise:

receiving, from the computing device, a second encrypted PIN based at least in part on a second public key of a second server; and sending the encrypted PIN instead of the second encrypted PIN to the server.

19. The device of claim 13, wherein the device comprises the access point and is registered with the server, and wherein providing the credential associated with the access point comprises sending, to the computing device from local memory of the device, the credential.

20. The device of claim 13, wherein providing the credential associated with the access point comprises establishing a transmission control protocol/internet protocol (TCP/IP) connection with the computing device, and wherein the operations further comprise terminating the TCP/IP connection based at least in part on providing the credential.

* * * * *